United States Patent
Maeda et al.

(10) Patent No.: US 7,533,378 B2
(45) Date of Patent: May 12, 2009

(54) FILE-UPDATE APPARATUS FOR UPDATING A FILE RECORDED ON A RECORDING MEDIUM

(75) Inventors: Takuji Maeda, Neyagawa (JP); Shinji Inoue, Neyagawa (JP)

(73) Assignee: Panasonic Corporation, Osaka (JP)

( * ) Notice: Subject to any disclaimer, the term of this patent is extended or adjusted under 35 U.S.C. 154(b) by 764 days.

(21) Appl. No.: 10/685,539

(22) Filed: Oct. 16, 2003

(65) Prior Publication Data
US 2004/0111582 A1    Jun. 10, 2004

(30) Foreign Application Priority Data
Oct. 17, 2002    (JP) ............................. 2002-302936

(51) Int. Cl.
  *G06F 9/44*    (2006.01)
(52) U.S. Cl. ...................... 717/168; 717/169; 717/174; 717/175; 711/163
(58) Field of Classification Search ......... 717/168–178; 711/163
See application file for complete search history.

(56) References Cited

U.S. PATENT DOCUMENTS

| | | | |
|---|---|---|---|
| 5,379,433 A | * | 1/1995 | Yamagishi .................. 726/30 |
| 5,734,894 A | | 3/1998 | Adamson et al. |
| 5,930,825 A | * | 7/1999 | Nakashima et al. ......... 711/163 |
| 6,243,796 B1 | * | 6/2001 | Otsuka ....................... 711/163 |
| 6,611,907 B1 | | 8/2003 | Maeda et al. |
| 2001/0051954 A1 | | 12/2001 | Yamashita |
| 2002/0059570 A1 | * | 5/2002 | Yoo ............................ 717/170 |
| 2002/0078244 A1 | | 6/2002 | Howard |

FOREIGN PATENT DOCUMENTS

| | | |
|---|---|---|
| JP | 7-44436 | 2/1995 |
| JP | 11-175383 | 7/1999 |
| JP | 2002-63057 | 2/2002 |

* cited by examiner

*Primary Examiner*—Lewis A Bullock, Jr.
*Assistant Examiner*—Michael Yaary
(74) *Attorney, Agent, or Firm*—Wenderoth, Lind & Ponack, L.L.P.

(57) ABSTRACT

A file-update apparatus, which can mount a removable information recording medium storing a FAT and a directory entry that show a storage location, on the medium, of data constituting a content of a file, and which executes a plurality of update procedures to update the file, records progress information showing which of the update procedures have been executed in updating the file into an internal memory having a continuous power supply. Even if an abnormal stoppage of the update procedures caused by a power-down or the like occurs during updating of the FAT, for example, the progress and update information remain in the memory. Thus, the FAT and the like can be re-updated and inconsistencies resolved using this information, after recovering from the abnormal stoppage.

12 Claims, 30 Drawing Sheets

FIG.2 *Prior Art*
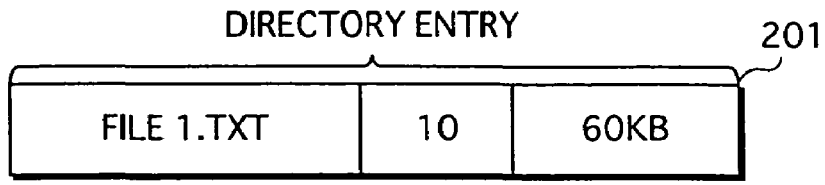
FIG.3 *Prior Art*
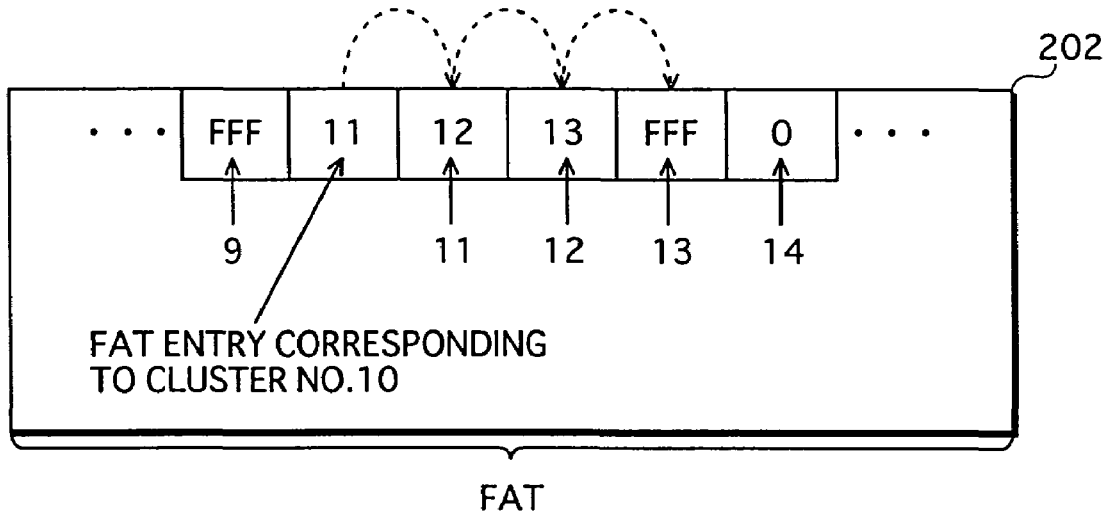
FIG.4 *Prior Art*
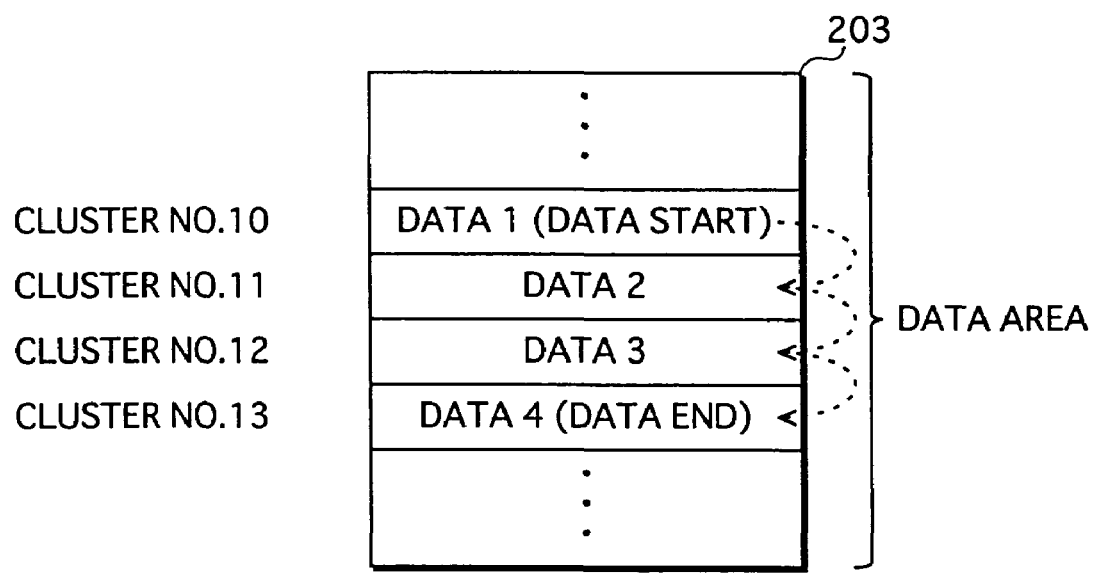

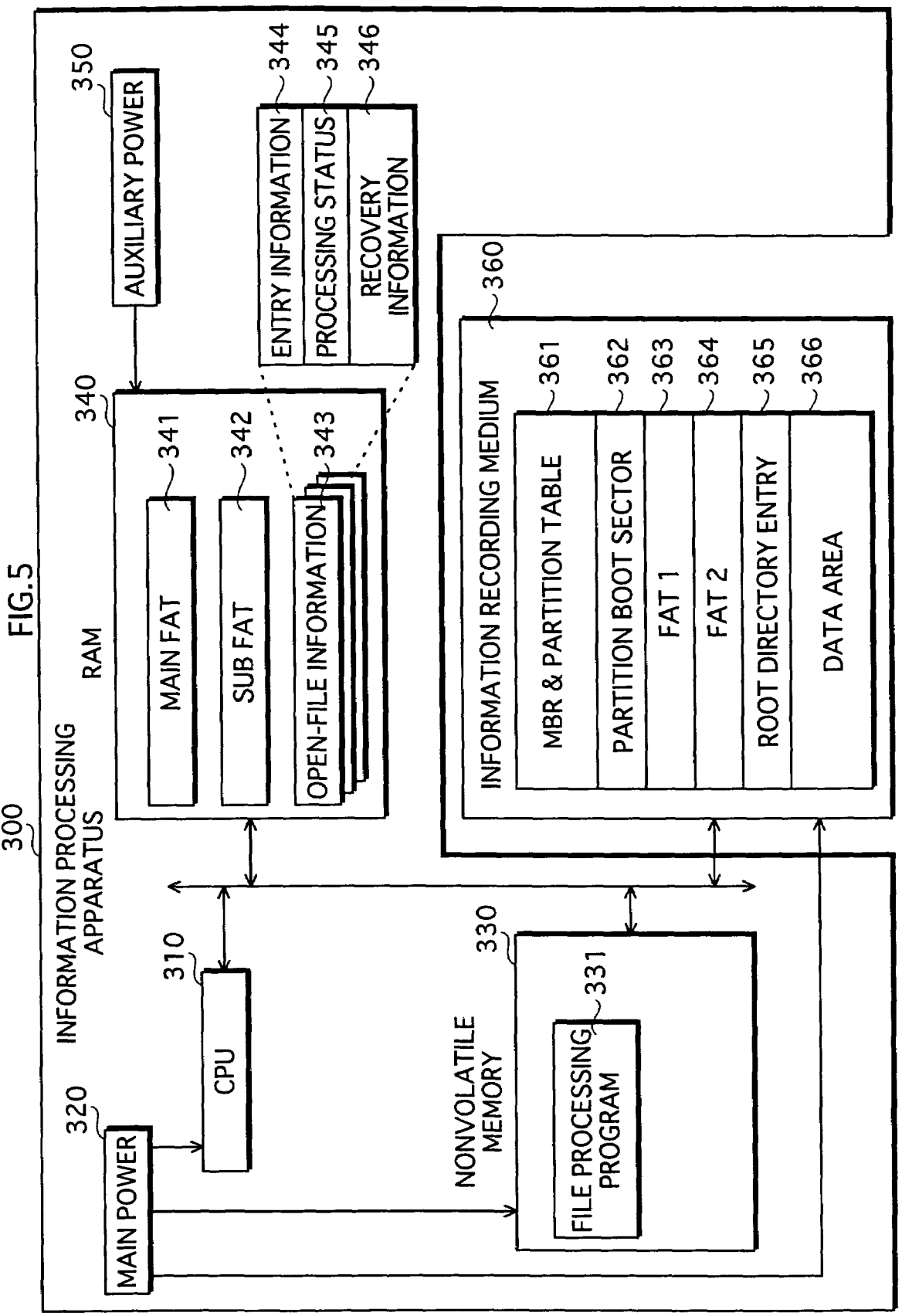

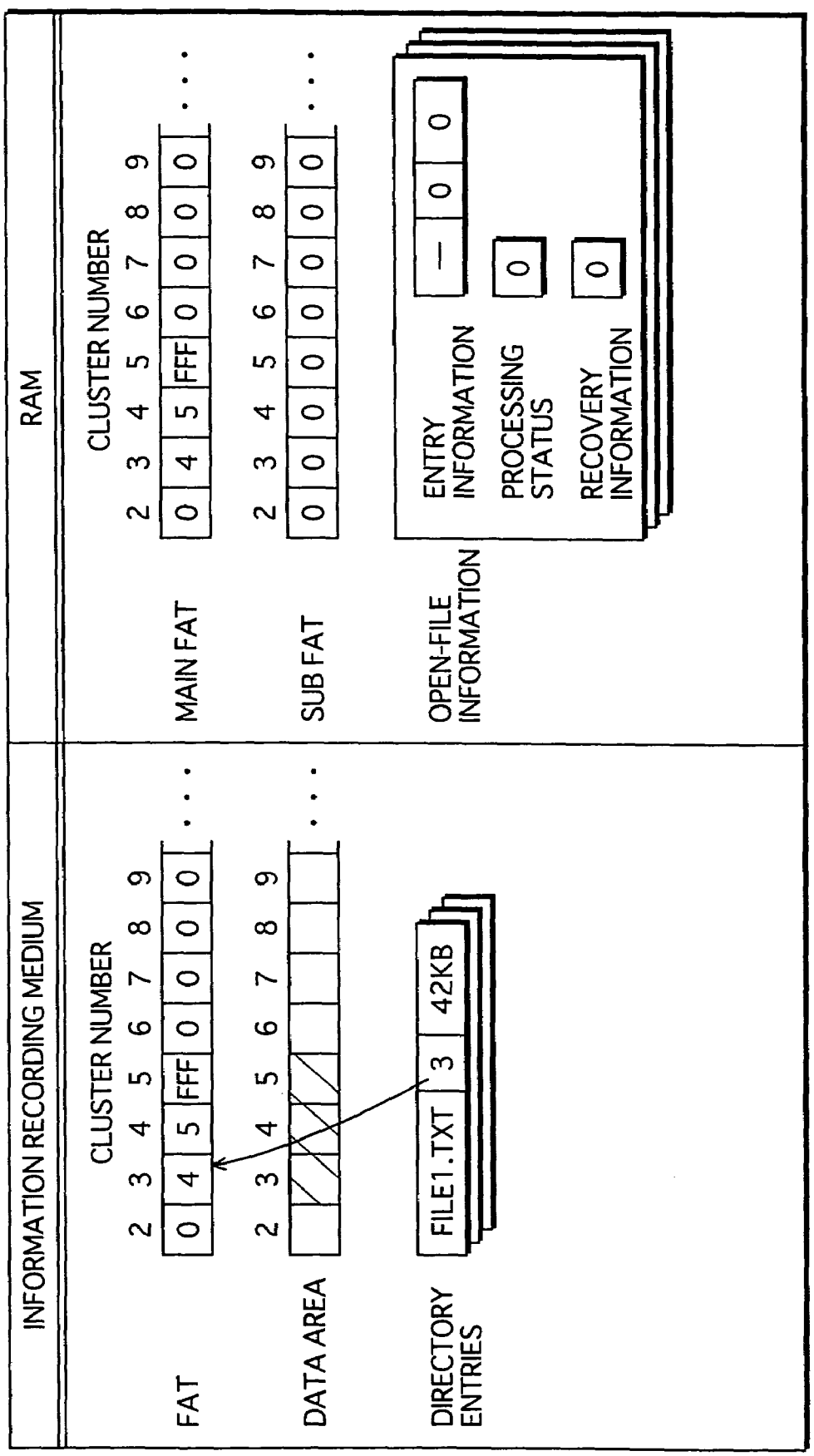

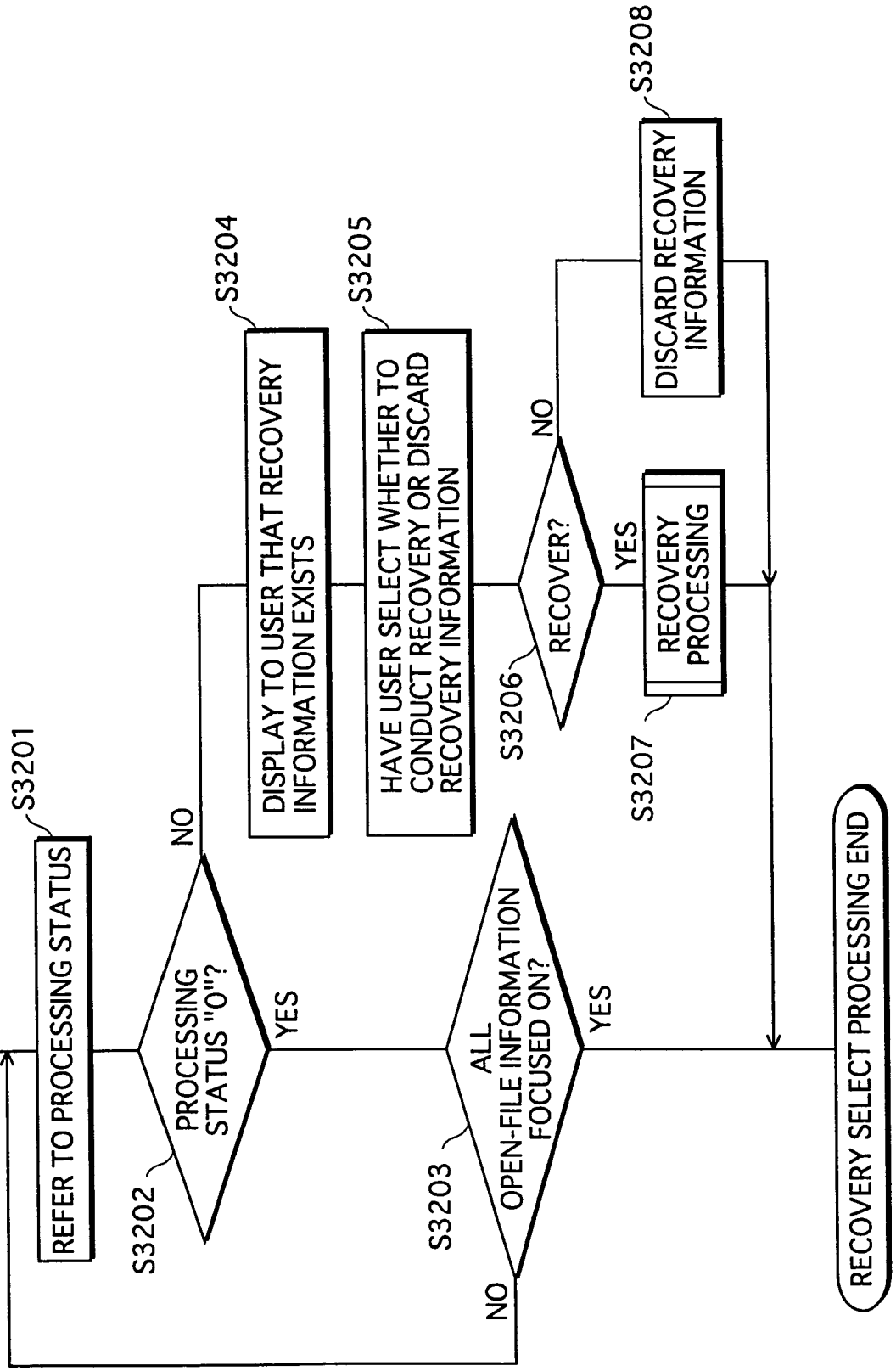

FILE-UPDATE APPARATUS FOR UPDATING A FILE RECORDED ON A RECORDING MEDIUM

BACKGROUND OF THE INVENTION

1. Field of the Invention

The present invention relates to technology for updating files stored on recording media such as semi-conductor memories and so forth. In particular, the invention relates to technology for resolving logical inconsistencies between the storage state of data constituting the content of a file and management information relating to the file, that arise when updating of the file is interrupted.

2. Related Art

Conventionally, the management of data stored in the recording area of recording media such as semi-conductor memories, magnetic disks, optical magnetic disks and the like, is realized by a file system. In a file system, the recording area is divided into clusters comprising sets of sectors, which are the smallest physical access units. Data recorded in one or more clusters is managed as a file. Files on recording media managed by a file system can be passed between devices that employ the same file system.

The following description relates to a FAT file system, which is one of the conventional file systems.

The FAT file system is the file system generally used in information processing apparatuses such as personal computers. A characteristic of this file system is the use of a table called a FAT (File Allocation Table) to manage the physical storage locations of data constituting file content and directory entries, which are the management information of files.

FIG. 1 shows the data structure within a recording area according to a FAT file system.

With the FAT file system in FIG. 1, a management information area 100 for managing the recording area of a recording medium is provided at the head of the recording area in terms of logical addresses. A data area 110 for storing data constituting file content (hereinafter "file data") and the like is located in the recording area after management information area 100.

Management information area 100 is formed from a master boot record (MBR) and partition table 101 storing information for managing the recording area as a plurality of areas called partitions, a partition boot sector 102 storing the management information of individual partitions, FATs 103 and 104 showing the physical storage locations of file data, and a root directory entry 105 storing information that relates to files and/or directories existing below a root directory. Given their importance as areas showing the physical storage locations of file data, FATs 103 and 104 are duplicated and thus have the same content.

Data storage area 110 is managed in clusters, each of which is for storing file data. When the amount of data constituting the content of a single file exceeds the capacity of a single cluster, the data is stored in a plurality of clusters, and the connection between the clusters is managed using link information stored in FATs 103 and 104.

FAT file systems are described in detail, for example, in ISO/IEC9293: 1994, Information technology: Volume and file structure of disk cartridges for information interchange.

FIG. 2 shows a directory entry (i.e. management information relating to a file), FIG. 3 shows a FAT, and FIG. 4 shows data constituting the content of a single file.

The relationship between a directory entry and file data in a FAT file system will now be described using FIGS. 2 to 4.

Directory entry 201 shown in FIG. 2 is stored together with other directory entries in root directory entry 105 and data area 110. Directory entry 201 is management information (i.e. filename, file size, etc.) relating to a single file.

As mentioned above, data area 110 is for storing file data and is managed in cluster-sized units. Attached to each cluster is a cluster number that allows the cluster to be uniquely identified. In order to specify clusters that store data constituting file content, the cluster number of clusters storing the initial part of any data (i.e. "starting cluster number") is stored in directory entry 201, together with the filename and the file size of the file. As illustrated in FIG. 2, directory entry 201 is formed from a filename "FILE1.TXT", a starting cluster number "10", and a file size "60 KB". This tells us that the initial part of the data constituting the content of the file "FILE1.TXT" is stored in cluster number 10, and that the total size of all of the data constituting the file content is 60 kilobytes.

As mentioned above, when the data of a single file is stored in a plurality of clusters, link information in a FAT is used to specify the cluster number of clusters that succeed the cluster shown by the starting cluster number.

FAT 202 shown in FIG. 3 contains FAT entries, each of which is a field corresponding to a cluster number. Each FAT entry shows whether or not the corresponding cluster is currently being used to record file data. If a cluster does record file data, the corresponding FAT entry stores the cluster number of a succeeding cluster that records data constituting the same file content. If a cluster does not have a succeeding cluster, the FAT entry stores "0xFFF", for example, as a value signifying the end of the same file data.

In the FIG. 3 example, "11" is stored in the FAT entry corresponding to cluster number 10, showing that cluster number 10 is linked to cluster number 11. Likewise, "12" and "13" are stored in the FAT entries corresponding respectively to clusters numbered 11 and 12, showing that the clusters numbered 10, 11, 12 and 13 are linked together in the stated order. "0xFFF" is stored in the FAT entry corresponding to cluster number 13. Since "0xFFF" signifies the termination of a link, we know that the link starting at cluster number 10 ends at cluster number 13.

The FAT entry corresponding to cluster number 14 stores "0", indicating that this cluster is a free space area; that is, a cluster to which file data has not been allocated.

FIG. 4 shows data constituting the content of the file "FILE1.TXT" (see FIGS. 2 and 3) as being data 1, data 2, data 3 and data 4 divided between four clusters.

The following description relates to the updating of file content in a FAT file system.

To update file content, information in directory entries and FATs 1 and 2 needs to be rewritten, in addition to writing the new file data to the recording medium. If the updating is interrupted due, for example, to power being cut off to an information processing apparatus that is in the process of updating file content, inconsistencies arise between the state of the actual file data and the management information in the directory entries and FATs 1 and 2. As a result, file storage locations cannot be correctly recognized, making it impossible to access files.

A conventional method proposed for resolving the above inconsistencies caused, for example, by power being cut off to an information processing apparatus partway through updating file content, involves implementing file restoration when the information processing apparatus is next operational. This method is disclosed, for example, in unexamined Japanese patent application publication no. 2002-63057.

According to this conventional method, when the new file content and the old file content prior to updating both exist on the recording medium, the directory entry and FATs are updated in the order FAT 1→directory entry→FAT 2, so as to make them consistent with the new file content. Also, restoration information (e.g. flags) showing the update procedures that have been completed is recorded in specific locations on the recording medium. If processing is interrupted during the updating of FAT 1, FAT 2 is overwritten onto FAT 1 based on the restoration information, to return FAT 1 to a pre-update state. Conversely, if processing is interrupted during the updating of a directory entry and FAT 2, FAT 1 is overwritten onto FAT 2 in addition to updating the directory entry, to conclude the file-update processing. As a result, inconsistencies relating to a file are resolved, allowing file storage locations to be correctly recognized.

However, the restoration information recorded on the recording medium when files are updated according to this conventional technology is only required at abnormal times when inconsistencies relating to files occur.

Thus, in terms of effectively and efficiently utilizing recording media for their primary objective which is recording files, it is preferable not to record information onto recording media that is only useful at abnormal times.

SUMMARY OF THE INVENTION

In view of the above issue, the present invention aims to provide a file-update apparatus and a file-update method that allow for resolving inconsistencies relating to a file on a recording medium which arise when updating of the file is interrupted, without recording information onto the recording medium that is only useful at abnormal times.

To achieve the above object, a file-update apparatus pertaining to the present invention is able to mount a removable first recording medium storing location information showing a storage location, on the first recording medium, of data constituting a content of a file, and executes a plurality of update procedures to update the file. The file-update apparatus includes a second recording medium; a progress recording unit operable to record, onto the second recording medium, progress information showing which of the update procedures have been executed in updating the file; a new-data recording unit operable to record, onto the first recording medium, data constituting a content of the file after updating, in a different storage location from the data constituting the content of the file before updating; an update information recording unit operable to record, onto the second recording medium, update information showing the storage location, on the first recording medium, of the data constituting the post-update file content; and an updating unit operable, after the update information has been recorded, to update the location information based on the update information, so as to show the storage location of the data constituting the post-update file content.

According to this structure, even if the updating of location information on a first recording medium using a plurality of procedures is interrupted due, for example, to an access mechanism to the first recording medium suffering a power-down or the first recording medium being removed from a file-update apparatus, causing inconsistencies between the location information and the storage location of data, for example, it is possible, if information on a second recording medium is used, to again update (hereinafter "re-update") the location information so as to conclude the updating. Also, since progress information and update information for dealing with inconsistencies at abnormal times are not held on the first recording medium, the area of the first recording medium can be efficiently used for recording files.

The presence on a first recording medium of information, normally meaningless except for when used to resolve inconsistencies, even when the first recording medium is removed from a file-update apparatus, for example, will likely confuse a user assuming that the user can access this information. In contrast, a file-update apparatus pertaining to the present invention allows such normally meaningless information to be recorded onto a second recording medium internal to the apparatus, rather than onto a removable first recording medium. This implies that the information does not pass outside of the apparatus. As a result, the chance of confusion being caused to a user that removes the first recording medium from the file-update apparatus for viewing purposes is reduced.

Here, the progress information may include information for identifying whether the update information has been recorded, and the file-update apparatus may further include a re-updating unit operable, if a predetermined condition is satisfied, to judge whether the update information has been recorded, based on the progress information, and when judged in the affirmative, to update the location information based on the update information, so as to show the storage location of the data constituting the post-update file content.

A predetermined condition includes, for example, power supply being resumed after the updating of a file on a first recording medium had become impossible due, for example, to a power-down suffered by an access mechanism to the first recording medium. In other words, a predetermined condition is one that requires the updating to be executed again in order to restore files and resolve inconsistencies, and is satisfied when the updating is returned to an executable state. This predetermined condition may be satisfied, for example, by a first recording medium being reattached to a file-update apparatus, after updating was interrupted partway through by the removal of the first recording medium from the file-update apparatus.

Thus, even if update processing is suspended partway through, it is possible to re-update information on the first recording medium (e.g. location information in a FAT, directory entry, etc.) after a predetermined condition has been satisfied, so that the information is consistent with a state of files on the first recording medium after updating (i.e. post-update state of files). Moreover, as long as the update information is not deleted, this effect can be achieved even when power supply to the first recording medium is cut off partway through file updating, if the second recording medium is, for example, a nonvolatile memory, or a volatile memory that is structured to receive long-term supply of power from a different power source to that of an access mechanism to the first recording medium.

Here, the file-update apparatus may further include an ID recording unit operable, before the updating of the file, to read unique medium identifier information from the first recording medium, and hold the medium identifier information within the file-update apparatus; and a re-update suppressing unit operable to read medium identifier information from a removable recording medium mounted in the file-update apparatus, compare the read medium identifier information with the held medium identifier information, and suppress the updating of the location information by the re-updating unit if the read medium identifier information does not match the held medium identifier information.

File recovery (i.e. re-updating location information to be consistent with the recorded state of file data) is only conducted when the recording medium mounted at the time of recovery is the same recording medium that was mounted at the time of updating. This structure makes it possible, for example, to prevent the content of other recording media from being destroyed.

Here, the location information may show storage locations of data constituting contents of all files on the first recording medium, the file-update apparatus may target a plurality of the files for updating, the progress recording unit may record progress information for each targeted file, the new-data recording unit may conduct, for each targeted file, the recording, onto the first recording medium, of data constituting a content of the file after updating, the update information recording unit may conduct the recording of update information, for each file that has undergone data recording by the new-data recording unit, the updating unit may conduct, for each file for which update information has been recorded, the updating of location information based on the update information of the file, and the re-updating unit, if the predetermined condition is satisfied, may conduct the updating of location information for each file, when judged, based on the progress information of the file, that update information relating to the file has been recorded.

According to this structure, even when a plurality of files are updated concurrently, it is possible to resolve inconsistencies in location information on the first recording medium to show a state after updating, for each of the files. Update information for each file refers, for example, to information relating to a head cluster, and information showing the link to a consecutive cluster.

Here, the file-update apparatus may further include a close instruction receiving unit operable to receive a close instruction relating to individual files that have undergone data recording by the new-data recording unit, the progress information may include information for identifying whether a close instruction has been received, the updating unit may conduct, for each file, the updating of location information, only after update information relating to the file has been recorded and a close instruction relating to the file has been received, and the re-updating unit, if the predetermined condition is satisfied, may conduct the updating of location information for each file, only when judged, based on the progress information of the file, that update information relating to the file has been recorded and a close instruction relating to the file has been received.

Updating and re-updating of location information on the first recording medium is conducted to show the location of post-update file data, only after a close instruction has been received. Thus, location information on the first recording medium that relates to files that have yet to be closed is not updated according to this structure. In other words, because location information on the first recording medium prior to the updating of a plurality of files being concluded (i.e. files in a pre-close state) shows the locations of file data prior to updating, the updating of the location information is in effect determined by the closing. Accordingly, when a plurality of related files form a single group, it is possible, by closing each file when updating of all of the files has been completed, to update location information on the first recording medium while synchronizing the timing of all of the files in the group.

Here, the first recording medium may store (i) FAT information showing, for each of a plurality of clusters on the first recording medium, whether data constituting any file content is stored in the cluster, and that clusters storing data constituting the content of the same file are linked, and (ii) directory information showing, for each file on the first recording medium, the first cluster storing data constituting the content of the file, the location information may be formed from the directory information and all FAT information except for unused-cluster information, which is FAT information showing clusters that do not store data constituting any file content, the update information relating to each file that has undergone data recording by the new-data recording unit may be formed from (i) consecutive-relation information showing that clusters storing data constituting the content of the file after updating are linked, and (ii) entry information showing the first cluster storing data constituting the post-update file content, the updating unit, for each file for which update information has been recorded, may update (i) the FAT information based on the consecutive-relation information of the file, so as to show that clusters storing data constituting the content of the file after updating are linked, and (ii) directory information relating to the file based on the entry information of the file, so as to show the first cluster storing data constituting the post-update file content, and the re-updating unit may update the location information by updating the FAT information based on the consecutive-relation information and the directory information based on the entry information.

This structure makes it possible to execute recovery when an abnormal suspension has occurred during the updating of files on the first recording medium that have been recorded in accordance with a file system expressing the file storage locations using FAT information and directory information, without needing to especially record information necessary for recovery onto the first recording medium. Consecutive-relation information equates to part of a main FAT or part of a sub FAT as shown in the embodiments.

Here, the file-update apparatus may further include an area-release unit operable, for each file for which update information has been recorded, to record, onto the second recording medium, free-space information showing that clusters which stored data constituting the content of the file before updating do not store data constituting any file content, the updating unit may conduct the updating of the FAT information so that the free-space information is reflected in the unused-cluster information, and the re-updating unit may conduct the updating of the FAT information so that the free-space information is reflected in the unused-cluster information.

Even if processing to update FAT information in response to the updating of a file, so as to show a storage location of post-update file data and that a cluster which stored the pre-update file data is now unused, is abnormally stopped partway through, this structure makes it possible to update the FAT information afterwards to show such a cluster as being unused.

Here, the file-update apparatus may further include a FAT-information copying unit operable, before the updating of any of the files, to copy the FAT information on the first recording medium into a working FAT area on the second recording medium, as working FAT information; and a close instruction receiving unit operable to receive a close instruction relating to individual files that have undergone data recording by the new-data recording unit, the progress information may include information for identifying whether a close instruction has been received, the new-data recording unit may record data constituting post-update file content into clusters not storing data constituting other post-update file content, based on (i) the working FAT information and (ii) the used-area information or the consecutive-relation information, the update information recording unit may make the working FAT information reflect (i) the consecutive-relation information of each file for which a close instruction has been received, and (ii) free-space information that shows clusters which stored data constituting the content of the file before updating do not store data constituting any file content, the updating unit may update the FAT information based on the working FAT information, and the re-updating unit, if the predetermined condition is satisfied, may (i) make the working FAT information reflect, for each file, consecutive-relation information and free-space information that relate to the file, when judged, based on the progress information of the file, that a close instruction relating to the file has been received, (ii) update the FAT information based on the working FAT information, and (iii) update the directory information based on the entry information of each file whose progress information shows that a close instruction has been received.

In relation to an updated file before being closed, this structure allows for clusters on the first recording medium that store data constituting file content to be managed as unavailable (i.e. not empty) clusters, and new data constituting file content after updating to only be recorded into empty clusters. Only after a file is closed are the FAT information and the directory information on the first recording medium made to reflect the post-update file data.

Here, the file-update apparatus may further include an update instruction receiving unit operable, at a time of re-updating, to receive an update instruction indicating that if the first recording medium stores data constituting post-update file content, the location information is to be updated so as to show the storage location of the data, and the re-updating unit, if the predetermined condition is satisfied and the update instruction has been received, may make the working FAT information, prior to use in updating the FAT information, reflect for each file, consecutive-relation information and free-space information that relate to the file, when judged, based on the progress information of the file, that update information relating to the file has been recorded.

According to this structure, even if a file has yet to be closed, it is possible to update the FAT information on the first recording medium as soon as the file-update apparatus is instructed, provided that the post-update file data is recorded on the first recording medium.

Here, the first recording medium may include an authentication area and a normal area that are mutually independent, a predetermined access restriction applying to only the authentication area of the two areas, the location information may be formed from (i) first location information showing storage locations, within the authentication area, of data constituting contents of all files in the authentication area, and (ii) second location information showing storage locations, within the normal area, of data constituting contents of all files in the normal area, the progress information may be formed from (i) first progress information showing, for each file in the authentication area, which of the update procedures have been executed in updating the file, and (ii) second progress information showing, for each file in the normal area, which of the update procedures have been executed in updating the file, the new-data recording unit may (i) conduct, for each file in the authentication area targeted for updating, the recording, into the authentication area, of data constituting a content of the file after updating, and (ii) conduct, for each file in the normal area targeted for updating, the recording, into the normal area, of data constituting a content of the file after updating, the update information may be formed from (i) first update information showing, for each file in the authentication area that has undergone data recording by the new-data recording unit, the storage location, within the authentication area, of data constituting the post-update file content, and (ii) second update information showing, for each file in the normal area that has undergone data recording by the new-data recording unit, the storage location, within the normal area, of data constituting the post-update file content, and the updating unit may (i) conduct, for each file in the authentication area for which first update information has been recorded, the updating of first location information based on the first update information of the file, and (ii) conduct, for each file in the normal area for which second update information has been recorded, the updating of second location information based on the second update information of the file.

This structure makes it possible, with respect to a recording medium having both an authentication area and a normal area, to recover files separately in either area.

Here, the first recording medium may be a flash memory, and the second recording medium may be a memory that is accessible faster than the first recording medium.

In other words, update information necessary for recovering files in flash memory is recorded in a memory that is accessible faster than flash memory. This structure makes it possible to prevent, to a certain extent, file updating delays caused by the characteristically slow access speeds of flash memory when recording partial data, that would otherwise occur if the update information were recorded in flash memory.

Here, the second recording medium may be a RAM, and have power supplied by a power source that is independent from a power source of the first recording medium.

According to this structure, power supply to RAM is not cut off, even if the updating of files on the first recording medium is suspended partway through due to power supply to the first recording medium being cut off. Here, it is generally possible to use a relatively high-speed RAM that holds recorded content as long as power is supplied. Since update information in RAM is not lost under normal conditions, even when power to the first recording medium is cut off, it is possible to use the update information to recover files after power supply to the first recording medium has been restored.

A file-update method pertaining to the present invention executes a plurality of update procedures to update a file on a first recording medium storing location information showing a storage location, on the first recording medium, of data constituting a content of the file, and includes the steps of recording, onto a second recording medium, progress information showing which of the update procedures have been executed in updating the file; recording, onto the first recording medium, data constituting a content of the file after updating, in a different storage location from the data constituting the content of the file before updating; recording, onto the second recording medium, update information showing the storage location, on the first recording medium, of the data constituting the post-update file content; and updating, after the update information has been recorded, the location information based on the update information, so as to show the storage location of the data constituting the post-update file content.

According to this structure, even if the updating of location information on a first recording medium using a plurality of procedures is interrupted due, for example, to an access mechanism to the first recording medium suffering a power-down or the first recording medium being removed from a file-update apparatus, causing inconsistencies between the location information and the storage location of data, for example, it is possible, if information on a second recording medium is used, to re-update the location information so as to conclude the updating. Also, since progress information and update information for dealing with inconsistencies at abnormal times are not held on the first recording medium, the area of the first recording medium can be efficiently used for recording files.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 2 shows a directory entry, which is management information relating to a file;

FIG. 3 shows a FAT;

FIG. 4 shows data constituting file content;

FIG. 5 is a structural diagram of an information processing apparatus 300 pertaining to an embodiment 1 of the present invention;

FIG. 6 shows an exemplary content of an information recording medium 360, and an exemplary content of a RAM 340 after completion of setup processing;

FIG. 32 is a flowchart of recovery-select processing, which a variation of the recovery processing.

DETAILED DESCRIPTION OF THE PREFERRED EMBODIMENTS

Figure 1:
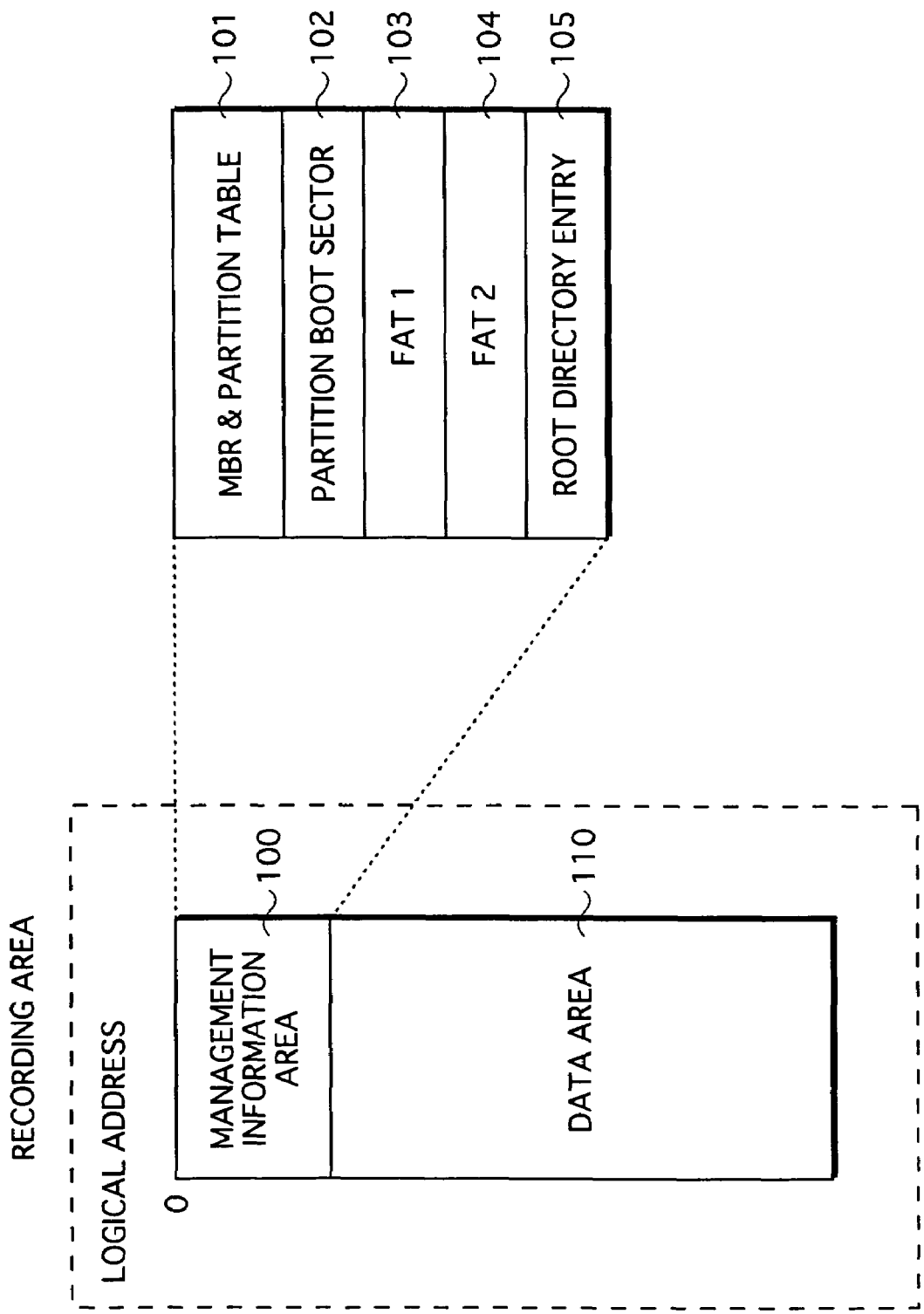
FIG. 1 shows a data structure of a recording area according to a FAT file system.

Information processing apparatuses pertaining to embodiments of the present invention will now be described with reference to the drawings.

Embodiment 1

Apparatus and Data Structure

FIG. 5 shows the structure of an information processing apparatus pertaining to embodiment 1 of the present invention.

Information processing apparatus 300 is, for example, a personal computer (PC) or a personal digital assistant (PDA). Apparatus 300 includes a memory card slot or the like for mounting an information recording medium 360 (e.g. memory card, etc.), and functions to edit and update files on medium 360 when mounted therein.

As shown in FIG. 5, information processing apparatus 300 includes a CPU 310, a main power source 320, a nonvolatile memory 330, a RAM 340 and an auxiliary power source 350. Although not depicted, apparatus 300 also includes an input interface for receiving user operations via keys, buttons and the like, a monitor for presenting information to a user, and so forth.

Here, main power source 320 is a rechargeable battery, and supplies power to information recording medium 360 as well as to the various elements of information processing apparatus 300. It is assumed that main power source 320 is unable to supply power for extended periods, and that continuous usage of information processing apparatus 300 for several hours or days, for example, will completely deplete the battery.

Nonvolatile memory 330 stores computer programs operated under the control of CPU 310. In particular, memory 330 stores a file-processing program 331 used in file update and recovery related processing, as well as application and system programs and the like (not depicted). Here, "recovery" refers to updating information that relates to a file again("re-updating"), in order to resolve abnormalities arising from incomplete file updating caused by power-downs and the like during an updating process.

RAM 340 receives a continuous supply of power from auxiliary power source 350, and constantly holds data. RAM 340 continues to hold data even if, for example, power supply from main power source 320 to the elements of information processing apparatus 300 is cut off. Auxiliary power source 350 is a primary battery capable of supplying power continuously for a given period.

RAM 340 stores a main FAT 341 showing the physical storage locations of data on information recording medium 360, a sub FAT 342 showing the physical storage locations of data newly recorded as a result of file updating, and open file information 343 that exists for each file targeted for updating. Main FAT 341 and sub FAT 342 show these storage locations in cluster units. Open file information 343 includes entry information 344, processing status 345, and recovery information 346.

Here, entry information 344 includes information such as the filename of a file targeted for updating, the cluster number of the first cluster (hereinafter, "starting cluster number") storing the file data (i.e. data constituting the content of the file), and the size of this data.

Processing status 345 shows the stage reached in the update processing. In other words, it is information showing which of a plurality of procedures that form the update processing have been executed. Processing status 345 changes sequentially with the completion of each procedure in the file-updating process, and is referred to during recovery processing performed to resolve inconsistencies in file management information arising when the updating of files is interrupted partway through.

Recovery information 346 is necessary for returning information that shows the location of files on information recording medium 360 to a pre-update state, and is formed from information such as the cluster number of the first cluster (i.e. starting cluster number) that stores data constituting the content of a file before updating.

Data recorded on information recording medium 360 is managed using a FAT file system. Medium 360 includes: a master boot record (MBR) and partition table 361 storing information for managing the recording area as a plurality of partitions; a partition boot sector 362 storing the management information of individual partitions; FATs 363 and 364 showing whether or not individual clusters, which are sets formed from a predetermined number of sectors, currently store file data, and the linked relationship between clusters; a root directory entry 365 storing information that relates to files and/or directories existing under the root directory; and a data area 366 for storing file data. FATs 363 and 364 are duplicate tables, and are generally presumed to have the same content. The "linked relationship" between clusters refers to the connection existing between clusters that store data constituting the same file content.

The storage locations of file data on information recording medium 360 are specified by directory entries stored in either root directory entry 365 or data area 366, and also by FAT 363 or 364.

Operations

The operations of information processing apparatus 300 will now be described.

In the event of an abnormal termination caused by a power-down or the like having occurred before the completion of file updating when information processing apparatus 300 was last operational, apparatus 300 commences recovery processing (described below) performed as a result of CPU 310 executing file-processing program 331, when power is supplied from main power source 320 in response, for example, to a user depressing a power-on button; that is, when apparatus 300 is booted. Apparatus 300 then conducts setup processing with information recording medium 360 mounted therein, before moving on to conduct update processing (described below) on individual files.

Setup processing involves copying FAT 363 on information recording medium 360 into main FAT 341 in RAM 340, clearing sub FAT 342 (i.e. setting all FAT entries to a "0" value), and nullifying the content of all open-file information.

FIG. 6 shows an exemplary content of information recording medium 360, and an exemplary content of RAM 340 after the completion of setup processing.

In FIG. 6, one of the directory entries on information recording medium 360 relates to a 42 KB file having the filename "FILE1.TXT". Data constituting the content of this file is stored from cluster number "3". The shading in the data area in FIG. 6 shows the clusters that store data constituting the file content.

The FAT shown in FIG. 6 represents FAT 1 and FAT 2, both of which have the same content. In the given example, the $3^{rd}$, $4^{th}$ and $5^{th}$ clusters are linked. It is revealed, by referring to the FAT in combination with the directory entry, that data constituting the content of the file "FILE1.TXT" is recorded in the $3^{rd}$, $4^{th}$ and $5^{th}$ clusters in the stated order. The FAT entry corresponding to the $5^{th}$ cluster stores "0xFFF", which indicates that data constituting the file content ends with this cluster (i.e. ending cluster of the link). FAT entries corresponding to succeeding clusters (i.e. $6^{th}$, $7^{th}$, etc.) store "0", indicating that file data has not been allocated to these clusters.

As a result of the setup processing, RAM 340 stores a main FAT that is identical to FAT 363, a sub FAT in which all FAT entries have been cleared (i.e. set to "0"), and open-file information that has been nullified. The storage of nullified open-file information indicates that effective open-file information does not exist.

The following description relates to update processing realized in information processing apparatus 300 by executing part of file-processing program 331.

Figure 7:
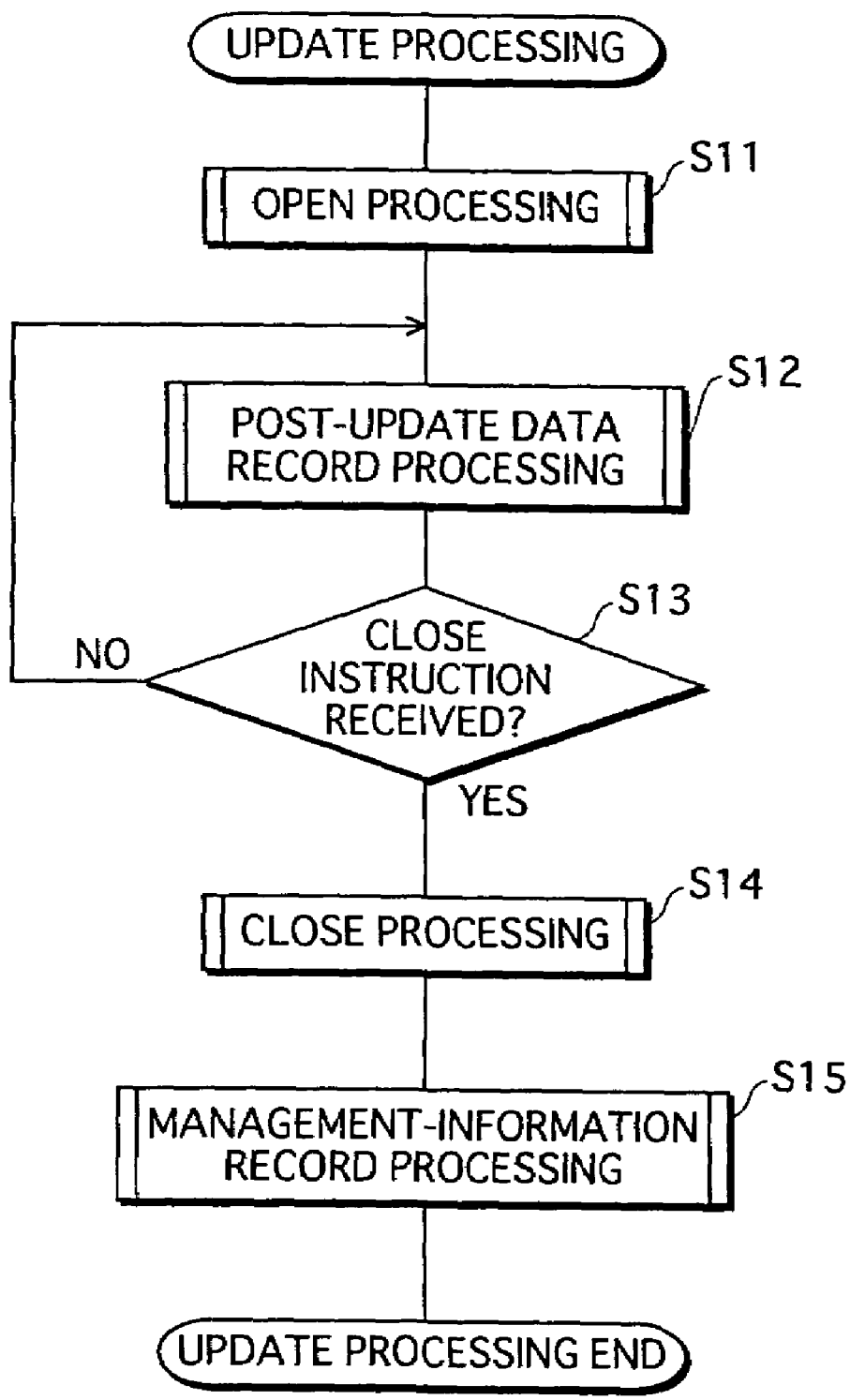
FIG. 7 is a flowchart showing an overview of update processing conducted by information processing apparatus 300.

FIG. 7 is a flowchart showing an overview of the update processing conducted by information processing apparatus 300.

The update processing is executed independently on individual files targeted for updating, and is assumed to be executable concurrently on a plurality of files. File-processing program 331 performs update processing when the updating of a file is requested during the execution of application or system programs.

To be able to return a file on information recording medium 360 to a pre-update state in the event that updating of the file is not fully completed, information processing apparatus 300 firstly executes: open processing, which relates mainly to the copying of existing data (step S11); post-update data record processing to record post-update data onto information recording medium 360 in response to the updating of a file, until the receipt of a close instruction (step S12, S13); close processing on receipt of a close instruction, which signifies that updating has been completed (step S14); and management-information record processing to record information for managing storage locations of post-update file data onto information recording medium 360 (step S15). A close instruction is given by an application program or a system program in response to a user operation or based on a predetermined conditional judgment.

A detailed description of the steps S11, S12, S14 and S15 processing will now be given, while referring to the changes undergone by data as a result of this processing.

Figure 8:
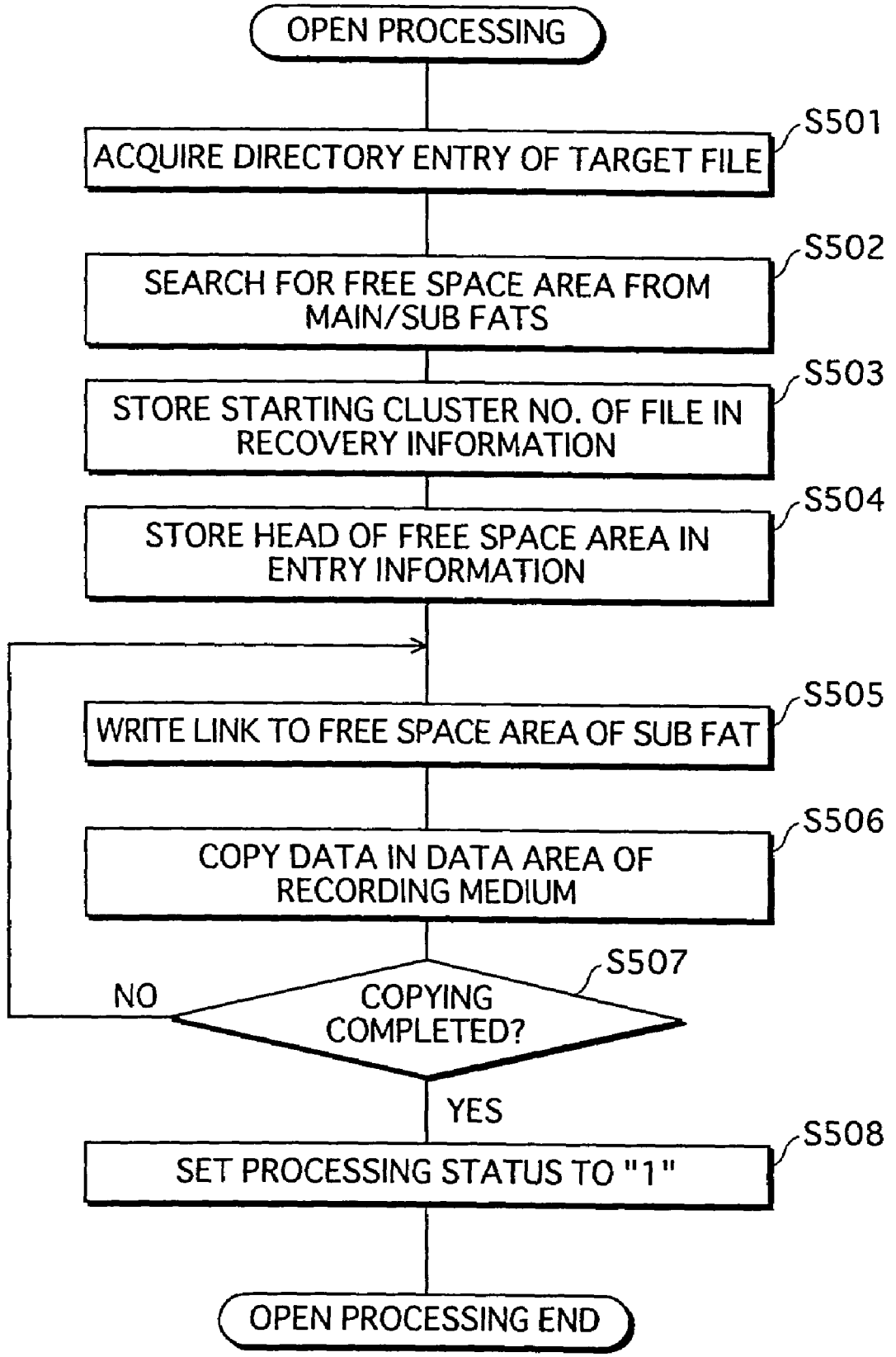
FIG. 8 is a flowchart of open processing conducted by information processing apparatus 300.

FIG. 8 is a flowchart of the open processing conducted by information processing apparatus 300.

Information processing apparatus 300, as a result of CPU 310 executing file-processing program 331, acquires a directory entry relating to a file targeted for updating by an application or system program from information recording medium 360, and writes the acquired directory entry to the entry information of open-file information in RAM 340 that relates to the targeted file (step S501). Apparatus 300 sets the processing status in the open-file information to "0".

Information processing apparatus 300 then refers to the file size in the directory entry acquired at step S501, and searches main FAT 341 and sub FAT 342 in RAM 340 for a free space area capable of accommodating this file size in data area 366 (step S502). If such a free space area does not exist, apparatus 300 displays an error message on the monitor and ends the update processing. In the search at step S502, apparatus 300 judges a cluster having a "0" FAT entry in both the main and sub FATs to be a free space area.

Following step S502, information processing apparatus 300 refers to the starting cluster number in the directory entry acquired at step S501, records the starting cluster number as recovery information in the open-file information (step S503), and records the cluster number to which the first retrieved free space area corresponds as the starting cluster number in the entry information of the open-file information (step S504).

Information processing apparatus 300 then writes a link to a FAT entry in sub FAT 342 that corresponds to an empty cluster (i.e. retrieved free space area) at step S505, and copies data constituting the content of the targeted file into the corresponding cluster on information recording medium 360 that was a free space area (step S506). Apparatus 300 repeats the steps S505 and S506 processing until all of the targeted file data has been copied in cluster-sized units (step S507). When all of the targeted file data has been copied, apparatus 300 sets the processing status in the open-file information relating to the targeted file to "1" (step S508)

Because information processing apparatus 300, in addition to reading information relating to a file targeted for updating into RAM and conducting file access setup, copies data constituting the content of the targeted file into a free space area on information recording medium 360, and conducts update processing on the copied data, this open processing makes it possible to return files to a state at the time of opening (i.e. recover files) in the event that update processing is suspended partway through.

Figure 9:
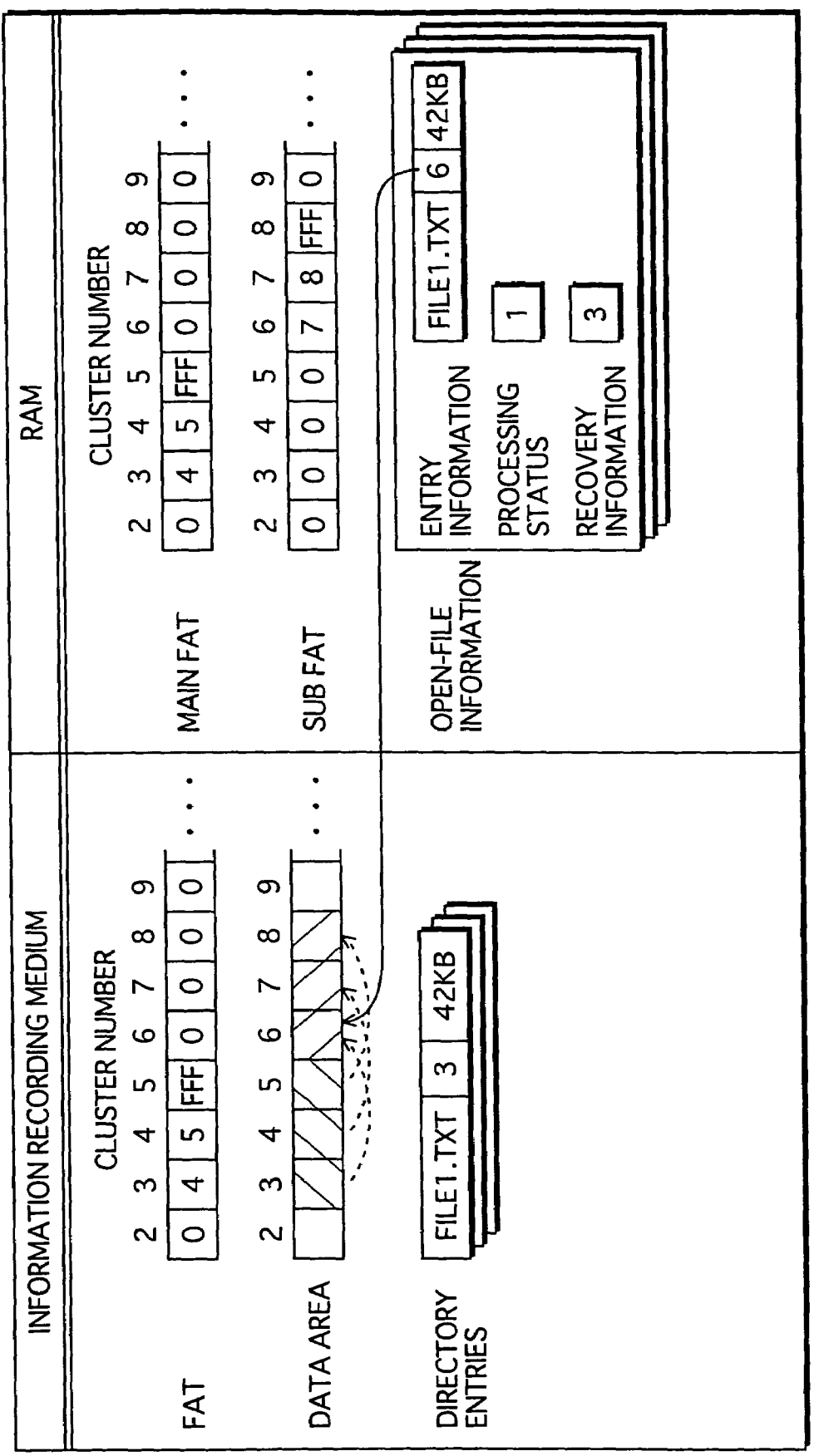
FIG. 9 illustrates a data state after completion of the open processing.

FIG. 9 illustrates a data state after completion of the open processing.

In the FIG. 9 example, the file on information recording medium 360 targeted for updating is FILE1.TXT. Data constituting the content of this file prior to updating is recorded in the $3^{rd}$, $4^{th}$ and $5^{th}$ clusters, and FAT entries in the FAT (i.e. FATs 1 & 2) and the main FAT that correspond to these clusters consequently have values other than "0".

Given the file size of 42 KB, the search for free space areas at step S502 resulted in the $6^{th}$, $7^{th}$ and $8^{th}$ clusters being retrieved. Here, information recording medium 360 has a 64 MB capacity, and a single cluster is 16 KB.

FIG. 9 depicts the state after the starting cluster number "3" in the directory entry has been recorded into the recovery information as a result of step S503, the starting cluster number of the entry information has been set as "6" as a result of step S504, links have been stored in the FAT entries corresponding to the $6^{th}$, $7^{th}$ and $8^{th}$ clusters in sub FAT 342 and data constituting the pre-update file content has been copied into the $6^{th}$ to $8^{th}$ clusters as a result of steps S505 to S507, and the processing status has been set to "1" as a result of step S508.

Figure 10:
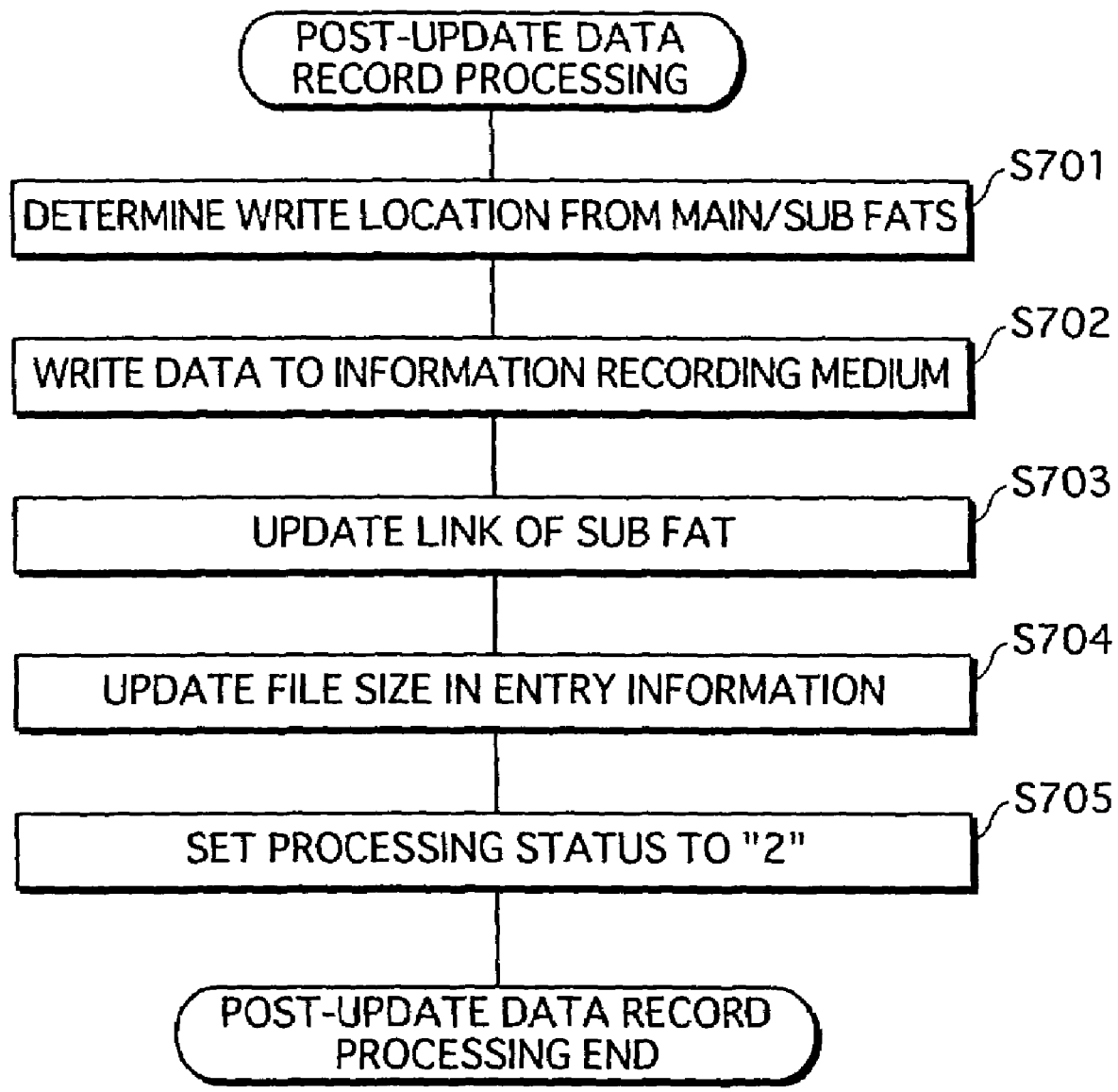
FIG. 10 is a flowchart of post-update data record processing conducted by information processing apparatus 300.

FIG. 10 is a flowchart of the post-update data record processing conducted by information processing apparatus 300.

Information processing apparatus 300 determines a write location from main FAT 341 and sub FAT 342 (step S701), and records data constituting the post-update file content into the determined write location on information recording medium 360 (step S702). In the case of overwriting data, apparatus 300 refers to sub FAT 342 to determine an overwrite location, and in the case of adding data, apparatus 300 retrieves a free space area from main FAT 341 and sub FAT 342, and determines the retrieved free space area as the write location. The post-update file content is determined by an application program or system program in response to a user operation or based on a predetermined calculation.

After recording data at step S702, information processing apparatus 300 updates the links in sub FAT 342 to correspond with clusters storing the recorded data if the FAT requires altering as a result of the recording (step S703), updates the file size in the entry information included in the open-file information relating to the targeted file if the file size has changed (step S704), and then sets the processing status in the open-file information to "2" (step S705).

Figure 11:
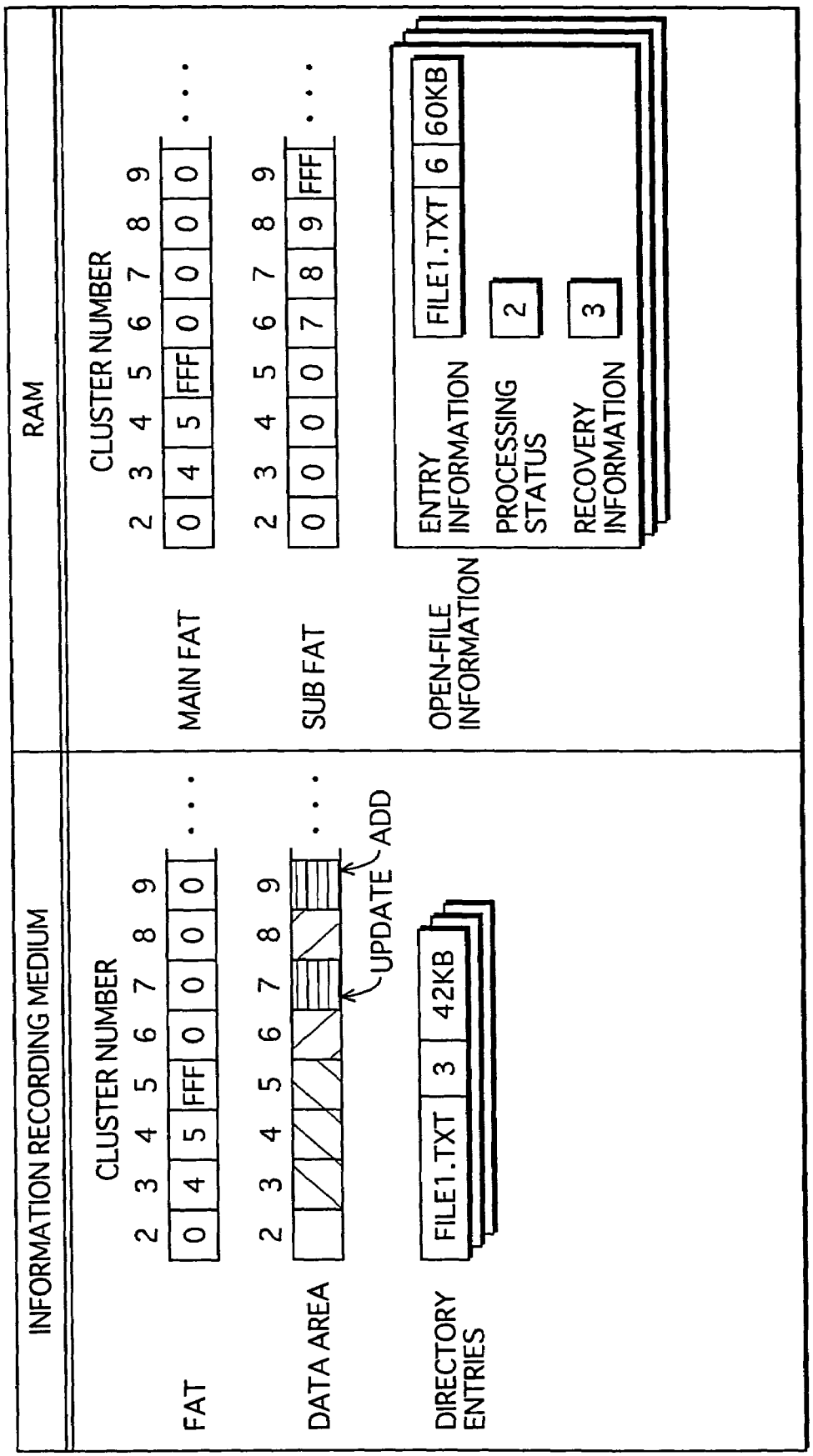
FIG. 11 illustrates a data state after completion of the post-update data record processing.

FIG. 11 illustrates a data state after completion of the post-update data record processing.

The state depicted in FIG. 11 follows that in FIG. 9. The data area in FIG. 11 shows the updating (overwriting) of the content of the $7^{th}$ cluster, which stores "FILE1.TXT" file data, and the addition of a $9^{th}$ cluster to store "FILE1.TXT" file data (steps S701, S702).

FIG. 11 also shows FAT entries in the sub FAT as having been updated (step S703), and the $6^{th}$ to $9^{th}$ clusters as linked clusters. Also, the file size in the entry information has been updated from 42 KB to 60 KB (step S704), and the processing status has been set to "2" (step S705).

Figure 12:
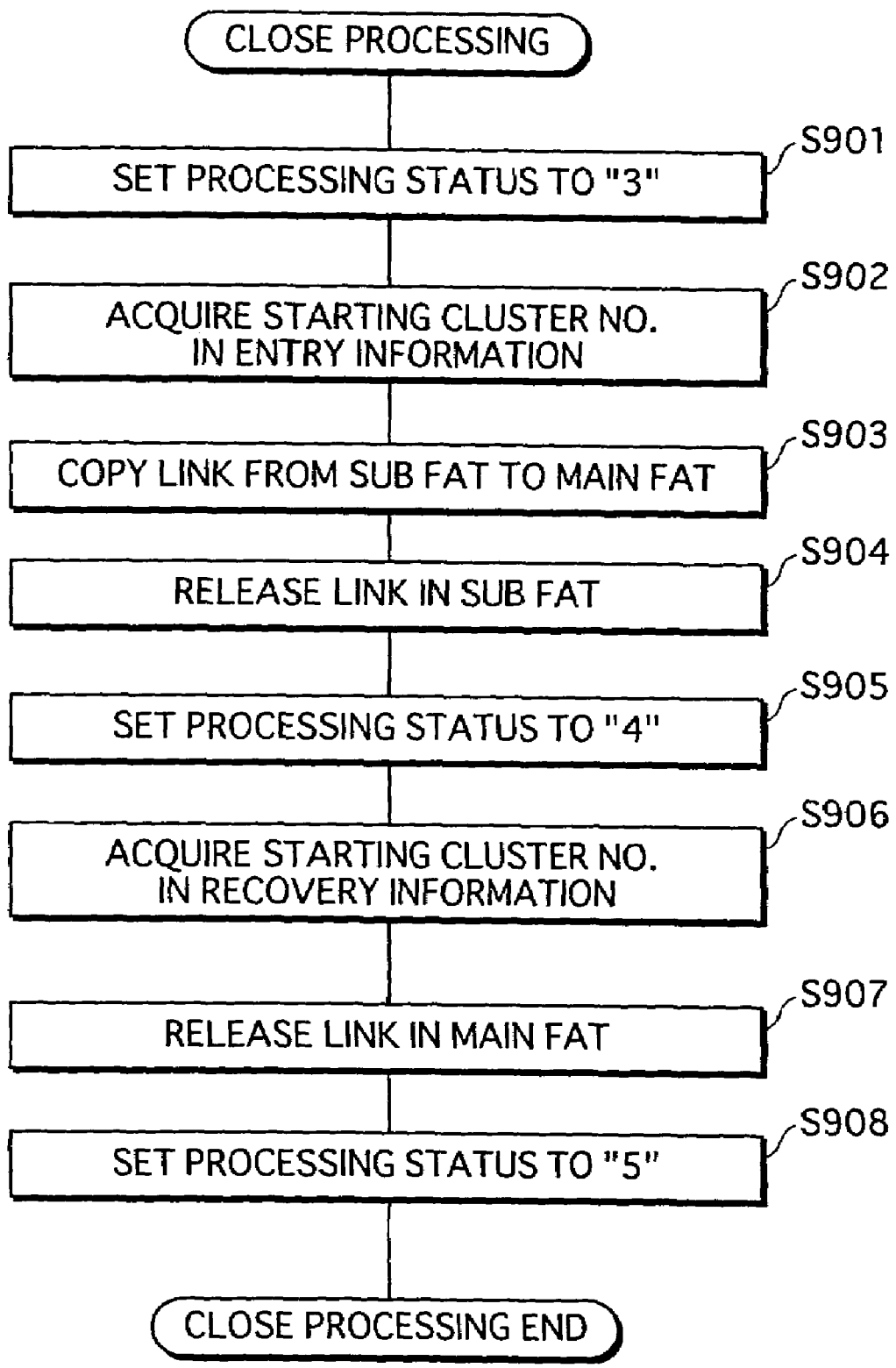
FIG. 12 is a flowchart of close processing conducted by information processing apparatus 300.

FIG. 12 is a flowchart of the close processing conducted by information processing apparatus 300.

Information processing apparatus 300 sets the processing status in the open-file information relating to the file targeted for updating to "3" (steps S901), and then acquires the starting cluster number in the entry information (step S902).

Following step S902, information processing apparatus 300 obtains the links starting from the acquired starting cluster number from sub FAT 342, and copies the obtained links into main FAT 341 (step S903). When all the links have been copied, apparatus 300 releases these links in sub FAT 342 (step S904). A link is released by changing the content of a FAT entry, corresponding to a cluster, that contains either the cluster number of another cluster or "0xFFF" to "0".

After completion of steps S904, information processing apparatus 300 sets the processing status in the open-file information relating to the targeted file to "4" (step S905). Apparatus 300 then refers to the recovery information showing the pre-update starting cluster number (i.e. the number of the head cluster storing the pre-update file data) and acquires this starting cluster number (step S906), releases the links starting from the FAT entry corresponding to the cluster specified by this starting cluster number from the main FAT (step S907), and sets the processing status to "5" (step S908).

Figure 13:
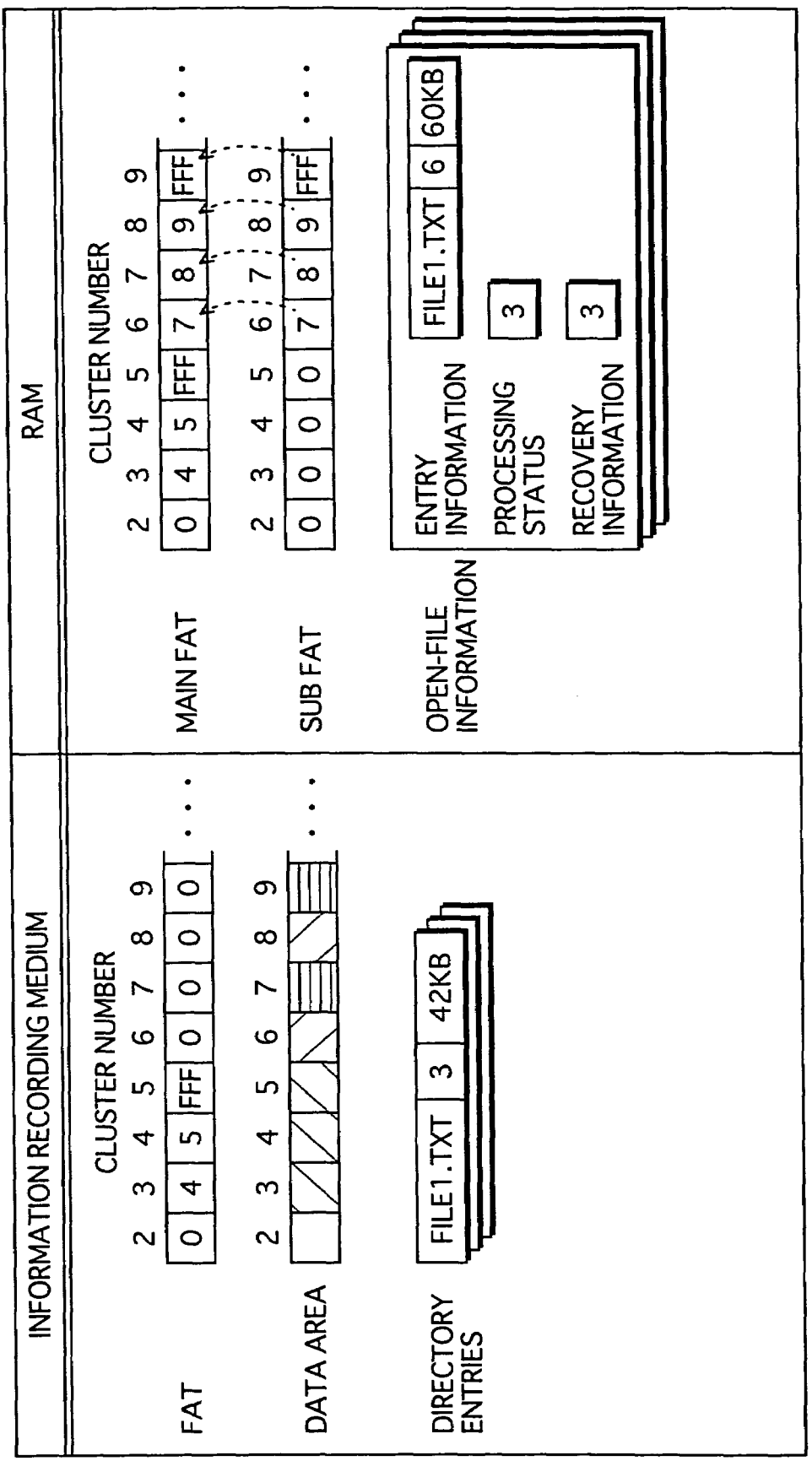
FIG. 13 illustrates a data state after completion of step S903 of the close processing.

FIG. 13 illustrates a data state after completion of step S903 of the close processing. The state depicted in FIG. 13 follows that in FIG. 11.

FIG. 13 shows "6" being acquired from the entry information as the starting cluster number (step S902), and the content of FAT entries corresponding to the $7^{th}$, $8^{th}$ and $9^{th}$ clusters linked from the FAT entry corresponding to the $6^{th}$ cluster in the sub FAT being copied into the main FAT (step S903).

Figure 14:
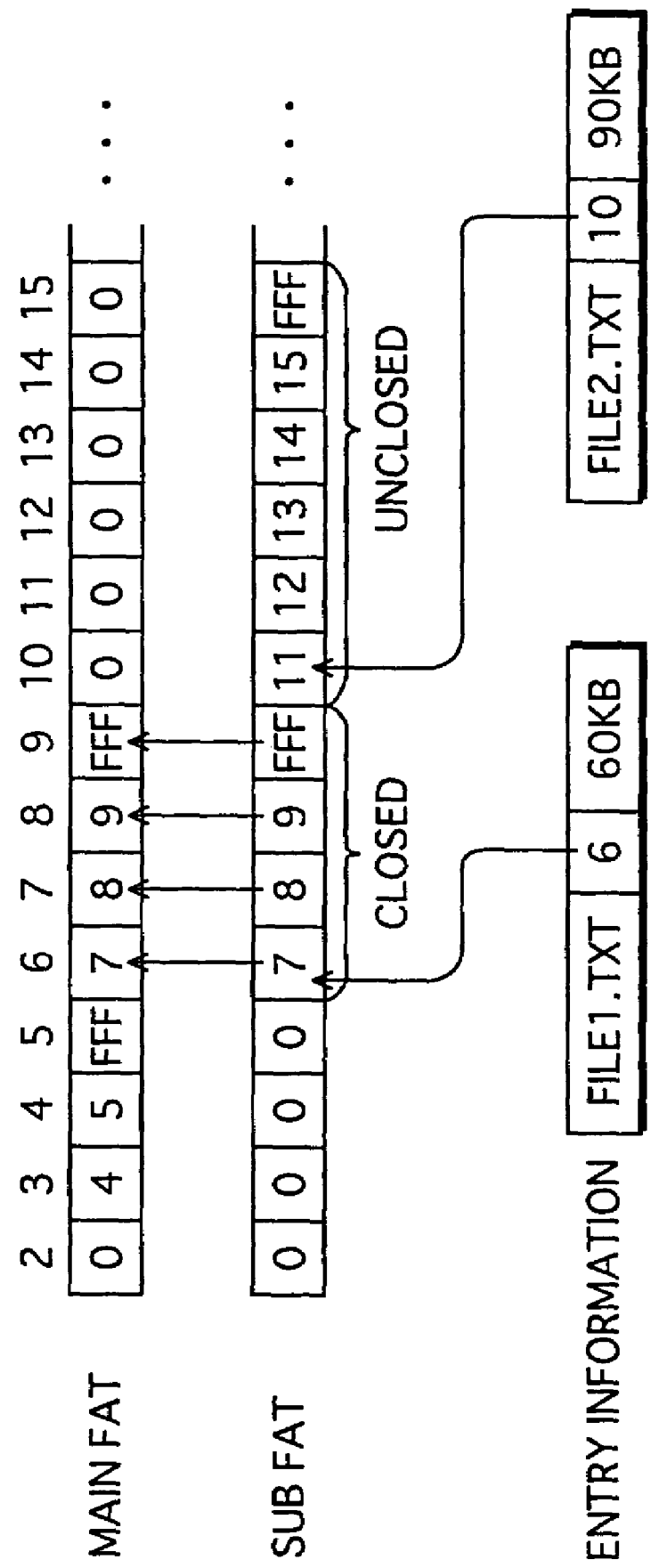
FIG. 14 shows a main FAT being updated when multiple files targeted for updating are processed concurrently.

FIG. 14 shows the main FAT being updated when multiple files targeted for updating are processed concurrently.

Only after a file has been closed is link information in the sub FAT that relates to data constituting the file copied into the main FAT as a result of step S903 in the close processing. In the FIG. 14 example, link information showing the clusters that store data constituting the content of the post-update file "FILE1.TXT", in relation to which a close instruction has been received, is copied from the sub FAT to the main FAT. However, link information showing the clusters that store data constituting the content of a post-update file "FILE2.TXT", in relation to which a close instruction has not yet been received (i.e. still being updated) is shown to exist only in the sub FAT, and has not been copied from the sub FAT to the main FAT. Since it is the main FAT that is copied into the FAT on information recording medium 360 as a result of the management-information record processing (described below), only information showing the storage location of data constituting the content of post-update files that have been closed is recorded into the FAT on medium 360.

Figure 15:
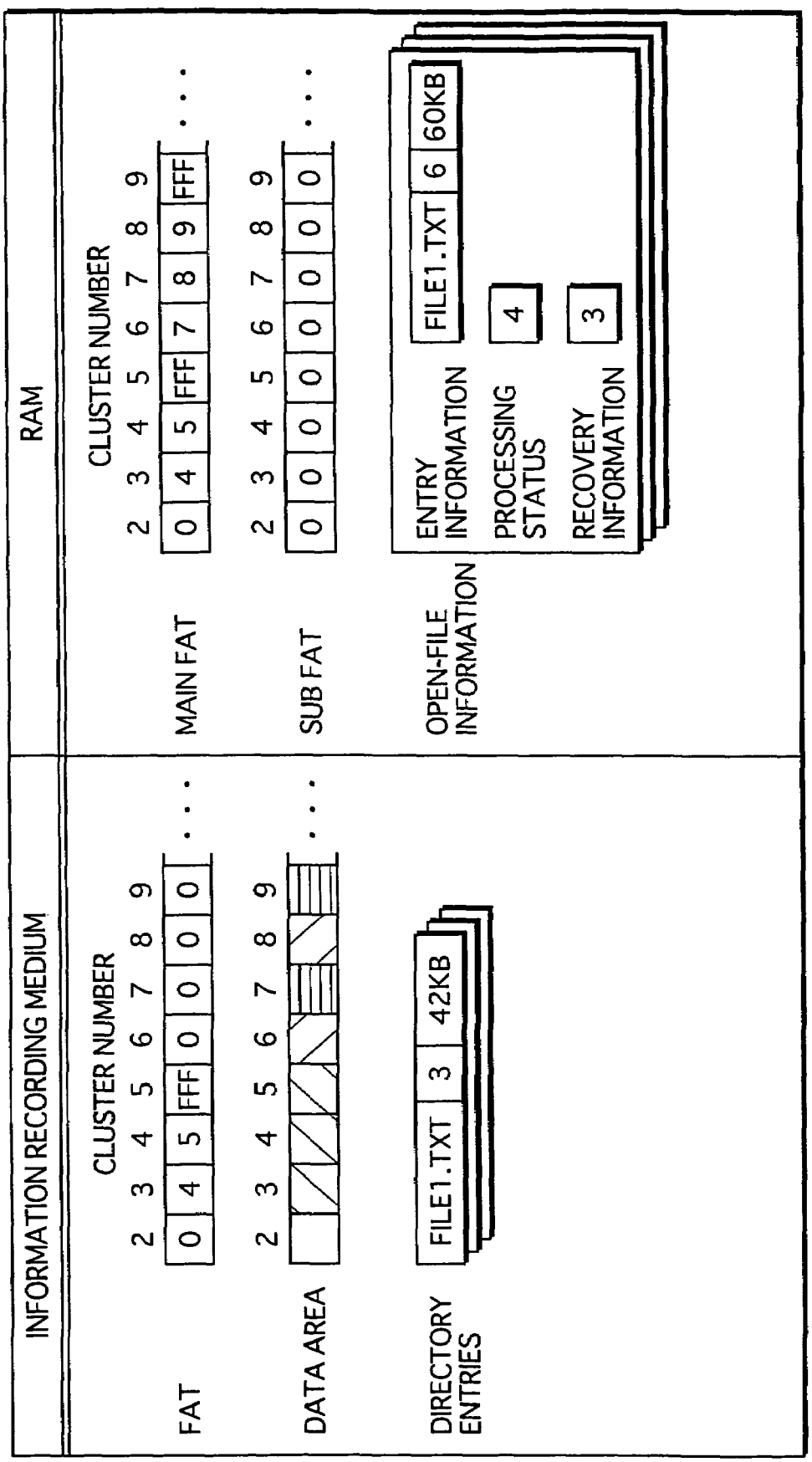
FIG. 15 illustrates a data state after completion of step S905 of the close processing.

FIG. 15 illustrates a data state after completion of step S905 of the close processing. The state depicted in FIG. 15 follows that in FIG. 13.

In FIG. 15, link information, in the sub FAT in FIG. 13, that showed the clusters storing post-update "FILE1.TXT" file data has been cleared as a result of step S904, and the processing status has been set to "4" as a result of step S905.

Figure 16:
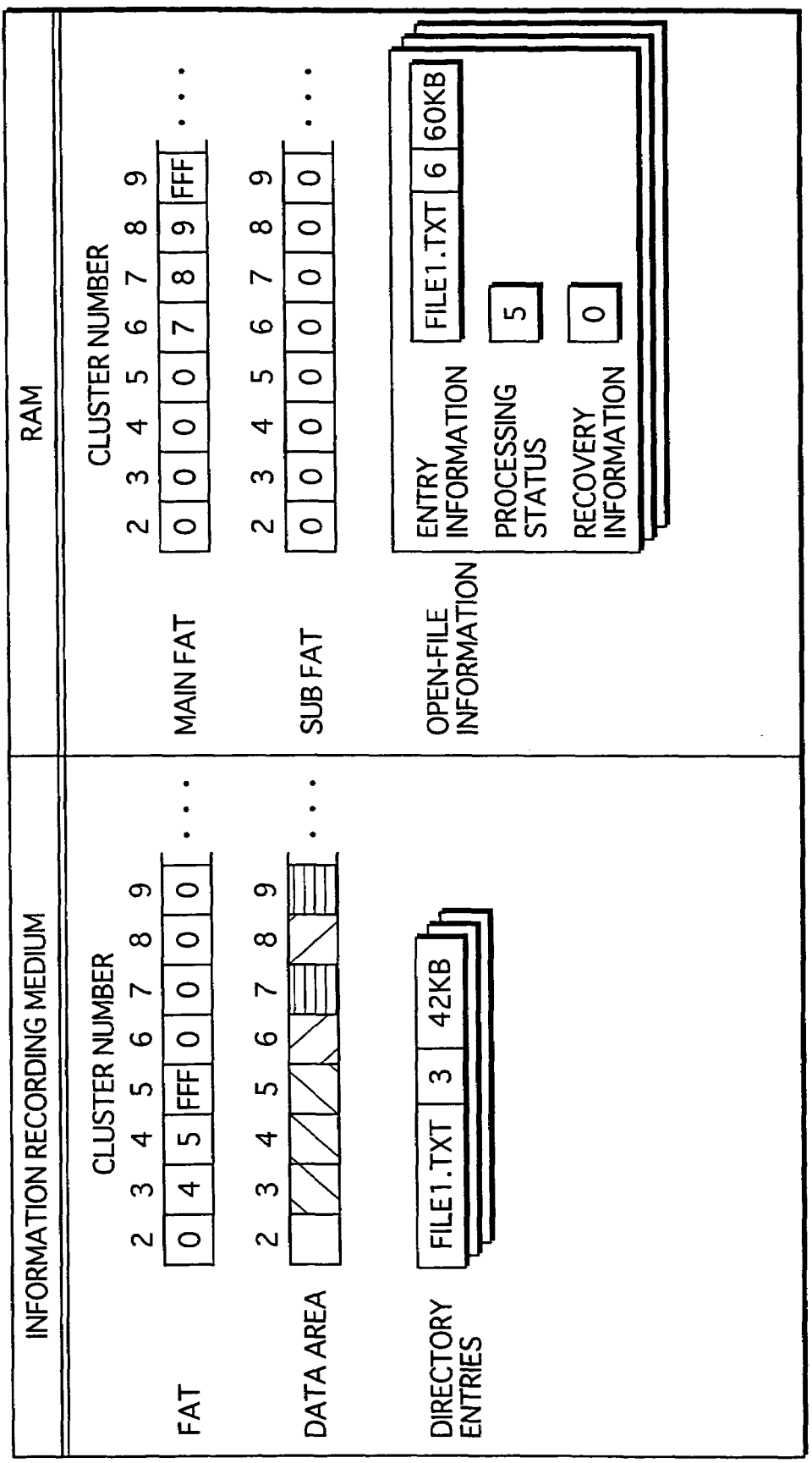
FIG. 16 illustrates a data state after completion of the close processing.

FIG. 16 illustrates a data state after completion of the close processing. The state depicted in FIG. 16 follows that in FIG. 15.

In FIG. 16, link information, in the main FAT in FIG. 15, that shows the clusters storing pre-update "FILE1.TXT" file data has been cleared as a result of step S907, and the processing status has been set to "5" as a result of step S908.

Figure 17:
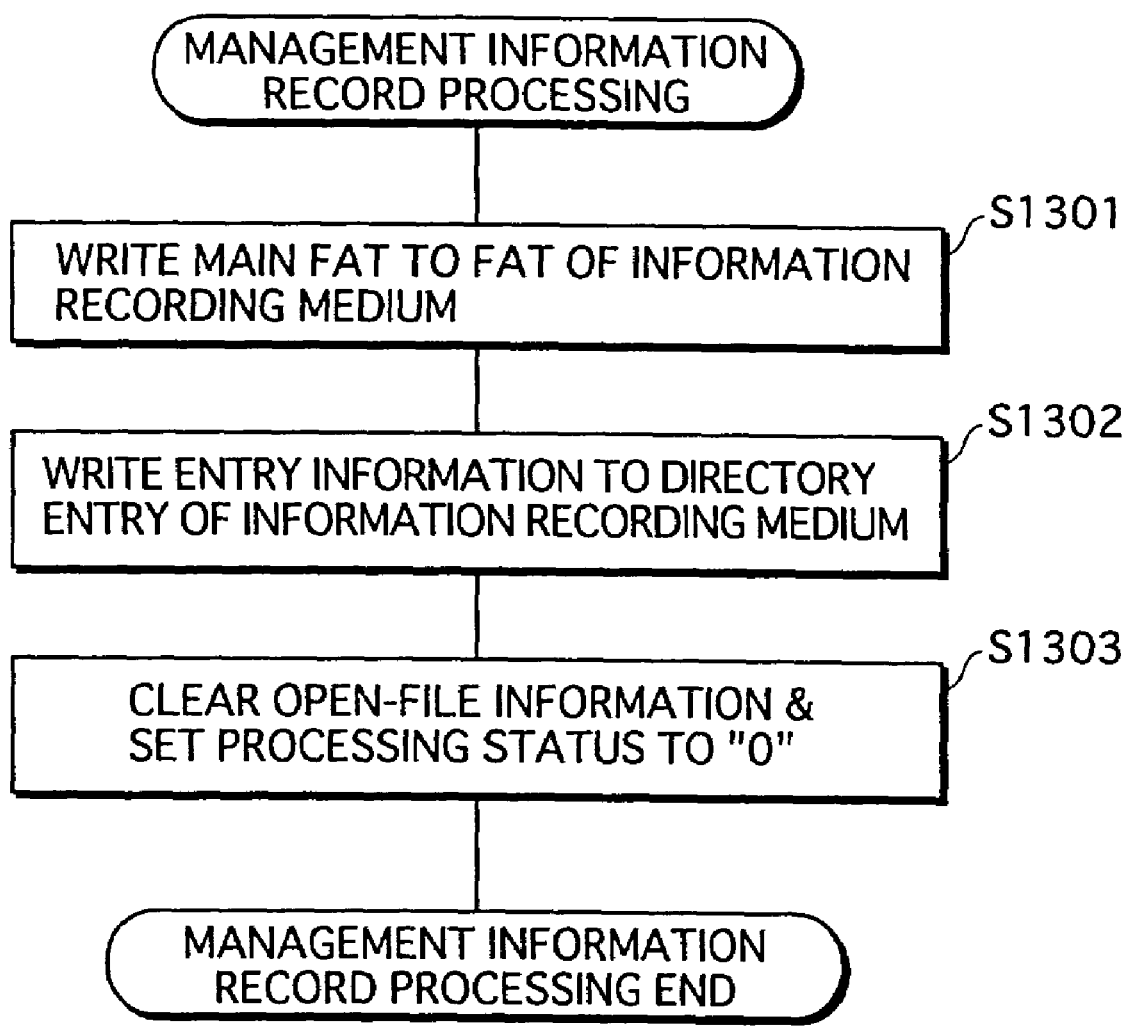
FIG. 17 is a flowchart of management-information record processing conducted by information processing apparatus 300.

FIG. 17 is a flowchart of the management-information record processing conducted by information processing apparatus 300.

Information processing apparatus 300 updates the FAT on information recording medium 360 by copying the content of the main FAT in RAM 340 into the FAT (step S1301). Here, the "FAT" into which the main FAT is copied refers specifically to both FATs 1 and 2.

After updating the FAT, information processing apparatus 300 conducts writing so that the entry information in open-file information relating to closed files in RAM 340 is reflected in the directory entries of corresponding files on information recording medium 360 (step S1302). Apparatus 300 then clears the open-file information and sets the processing status to "0" (step S1303), before ending the management-information record processing.

Figure 18:
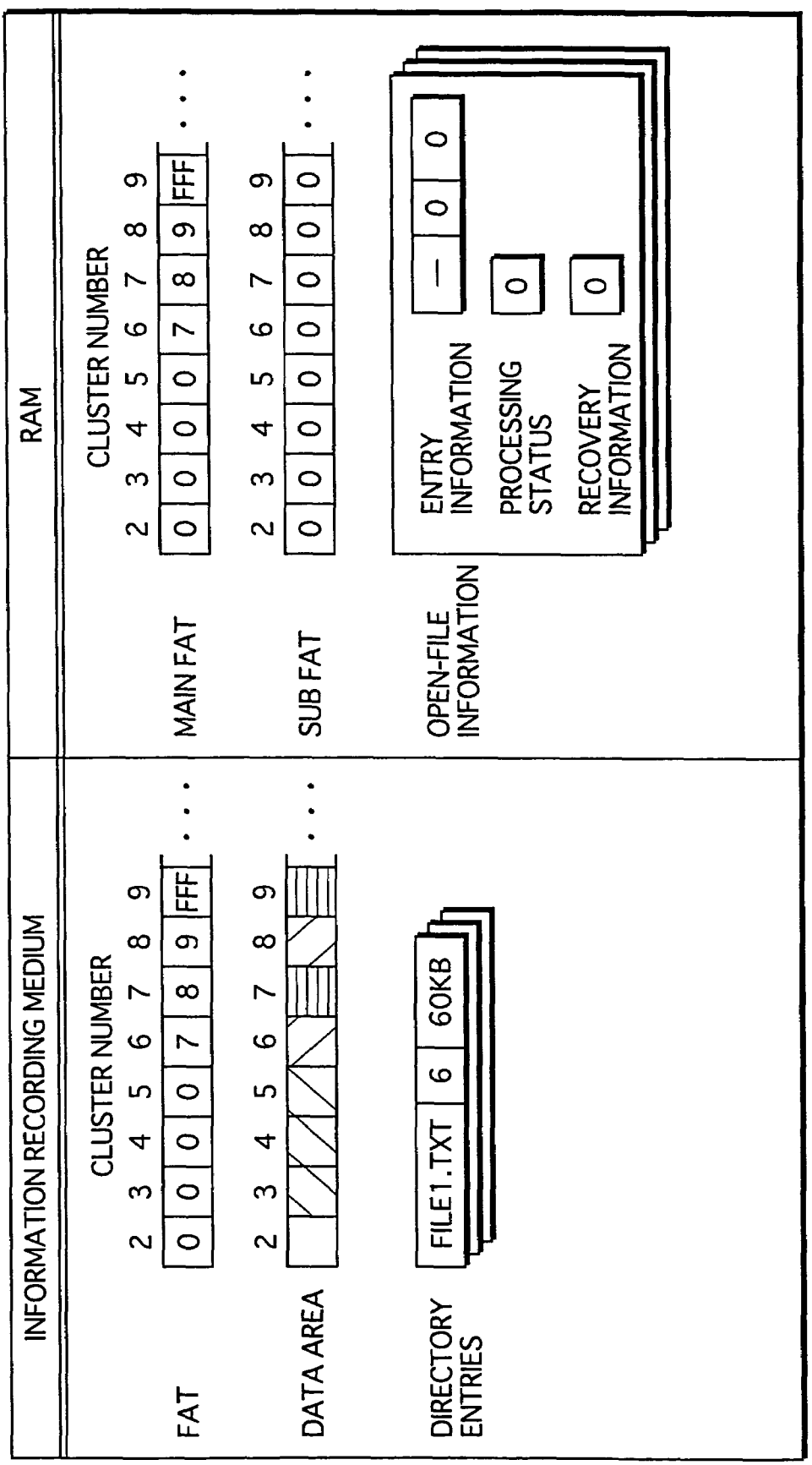
FIG. 18 illustrates a data state after completion of the management-information record processing.

FIG. 18 illustrates a data state after completion of the management-information record processing. The state depicted in FIG. 18 follows that in FIG. 16.

In FIG. 18, link information, in the FAT in FIG. 16, that shows the clusters storing pre-update "FILE1.TXT" file data (i.e. values stored in FAT entries corresponding to the $3^{rd}$ to $5^{th}$ clusters) has been cleared as a result of step S1301. Also, the directory entry has been updated, and the open-file information relating to "FILE1.TXT" has been cleared.

The following description relates to recovery processing, which is realized in information processing apparatus 300 by executing part of file-processing program 331.

Recovery processing is processing executed after the resumption of power supply from the main power source in the event of file updating having been suspended partway through as a result of power supply from the main power source being cut off, for example. Power supply may be resumed, for example, when a user turns power on after a battery (main power source) has been recharged.

Figure 19:
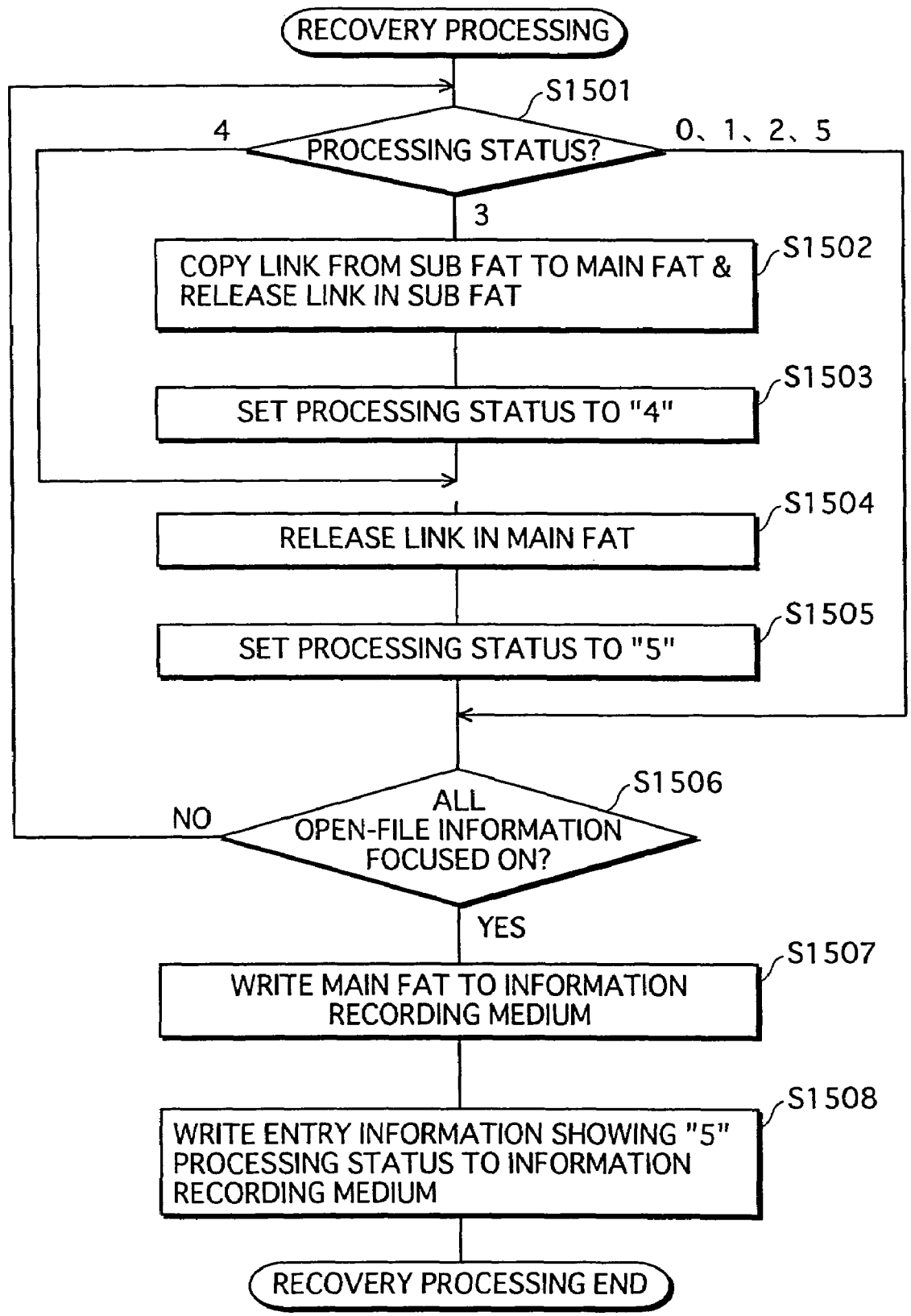
FIG. 19 is a flowchart of recovery processing conducted by information processing apparatus 300.

FIG. 19 is a flowchart of the recovery processing conducted by information processing apparatus 300.

On commencement of the recovery processing, information processing apparatus 300 firstly focuses sequentially on each piece of open-file information held in RAM 340, and judges the processing status included therein (step S1501). If the processing status is judged to be "3", apparatus 300 searches the sub FAT for links that start from the FAT entry corresponding to the starting cluster number in the entry information of the open-file information focused on, and continue until a FAT entry containing "0xFFF". Apparatus 300 copies the content of these FAT entries into FAT entries corresponding to the same clusters in the main FAT and clears these FAT entries in the sub FAT (step S1502), before setting the processing status to "4" (step S1503).

Step S1502 of the recovery processing is executed because a "3" processing status shows that update processing stopped during copying from the sub FAT to the main FAT or during the release of links in the sub FAT.

Because link information in the sub FAT that corresponds to the starting cluster number in the entry information has been set to "0" when update processing is suspended partway through the release of links in the sub FAT, apparatus 300 searches the main FAT at step S1502 for links that start from the FAT entry corresponding to the starting cluster number in the entry information of the open-file information focused on, and continue until a FAT entry containing "0xFFF", and clears the content of FAT entries in the sub FAT that corresponds to the same clusters in the main FAT.

If step S1503 has been executed, or the processing status is judged at step S1501 to be "4", information processing apparatus 300 obtains a starting cluster number of data constituting pre-update file content, shown in the recovery information of open-file information focused on, clears all the FAT entries linked to the FAT entry in the main FAT that corresponds to this starting cluster number to release these links (step S1504), and sets the processing status to "5" (step S1505).

Information processing apparatus 300 conducts the release of links in the main FAT by clearing the link information in a FAT entry after firstly storing this link information (i.e. cluster number of FAT entry whose link is to be released next) and the cluster number of the FAT entry containing this link information in the recovery information. This enables the release of links in the main FAT to be conducted correctly, even if the update processing stops during the release of these links. The cluster number and link information of FAT entries are recorded in the recovery information by the execution of a single command issued to CPU 310.

Consider an example in which the links of FAT entries corresponding to cluster numbers 3, 4 and 5 are released. After storing "3,4" in the recovery information, information processing apparatus 300 sets the FAT entry corresponding to cluster number 3 in the main FAT to "0" (i.e. showing free space area). Then, after changing the recovery information to "4,5", apparatus 300 sets the FAT entry corresponding to cluster number 4 in the FAT to "0". Finally, after setting the recovery information to "5, 0xFFF", apparatus 300 sets the FAT entry corresponding to cluster number 5 in the FAT to "0", and sets the recovery information to "0". By releasing links in the main FAT according to this procedure it is possible, even if update processing is suspended during the release of links, to proceed with the release processing when the recovery processing is next conducted.

After completing step S1505, or if the processing status in the open-file information focused on is judged at step S1501 to be one of "0", "1", "2", or "5", information processing apparatus 300 judges whether all of the open-file information has been focused on (step S1506). If there is still open-file information that has not been focused on, apparatus 300 focuses on this open-file information and returns to step S1501 to repeat the processing. When all of the open-file information has been focused on, apparatus 300 copies the content of the main FAT in RAM 340 into FATs 1 and 2 on information recording medium 360 (step S1507).

Following step S1507, information processing apparatus 300 retrieves, from among all of the open-file information, those pieces whose processing status is "5", and conducts writing so that the entry information in all of the retrieved open-file information is reflected in the directory entries of corresponding files on information recording medium 360 (step S1508). Apparatus 300 then clears all of the open-file information and ends the recovery processing.

As a result of the above recovery processing, files whose update processing was suspended after the receipt of a close instruction, are recovered to a post-update state, while files whose update processing was suspended before the receipt of a close instruction, are returned to a state at the time of opening (i.e. a pre-update state). Moreover, information processing apparatus 300 focuses on individual pieces of open-file information and recovers files separately in accordance with their respective processing status. Consequently, even if a plurality of files are updated concurrently, it is possible to appropriately recover files according to respective stages reached in the update processing; that is, to conduct re-updating so as to eliminate inconsistencies relating to FATs and directory entries for managing files.

Embodiment 2

Apparatus and Data Structure

Figure 20:
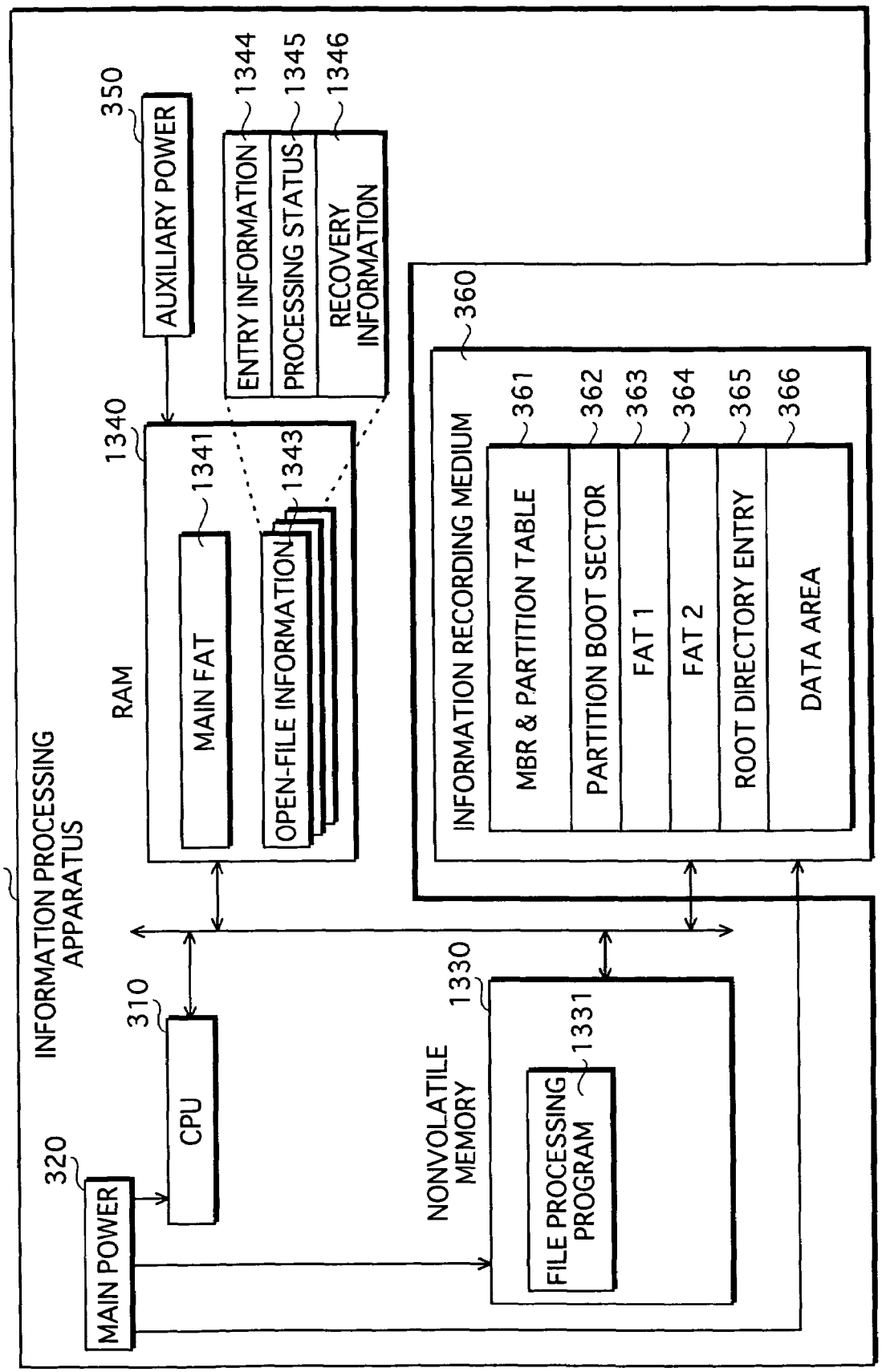
FIG. 20 is a structural diagram of an information management apparatus 1300 pertaining to an embodiment 2 of the present invention.

FIG. 20 shows the structure of an information processing apparatus pertaining to embodiment 2 of the present invention.

Information processing apparatus 1300 pertaining to embodiment 2 has substantially the same structure as information processing apparatus 300 described in embodiment 1. Apparatus 1300 differs from apparatus 300 in that it conducts updating and recovery of files without the use of a sub FAT. In FIG. 20, elements of apparatus 1300 that are the same as those of apparatus 300 are shown using the same reference numerals.

When a file on information recording medium 360 is updated repeatedly in information processing apparatus 1300, the state of the most recent update is reflected in the FATs and the directory entry on medium 360, even if an instruction to close the file has not yet been given. Thus, if update processing is suspended as a result, for example, of power supply from the main power source being cut off, as long as the data has already been updated and information showing the updated storage location of this data has been stored in RAM, the file can be recovered by re-updating the FATs and the like to return them to a state when last updated.

As shown in FIG. 20, information processing apparatus 1300 includes a CPU 310, a main power source 320, a nonvolatile memory 1330, a RAM 1340 and an auxiliary power source 350. Although not depicted, apparatus 1300 also includes an input interface for receiving user operations via keys, buttons and the like, a monitor for presenting information to a user, and so forth.

Nonvolatile memory 1330 stores computer programs operated under the control of CPU 310. In particular, memory 1330 stores a file-processing program 1331 used in file update/recovery related processing. With program 1331, it is possible to update prior to closing a file. Memory 1330 also stores application and system programs, and the like (not depicted).

RAM 1340 receives a continuous supply of power from auxiliary power source 350 (battery, etc.), and constantly holds data. RAM 1340 continues to hold data even if, for example, power supply from main power source 320 to the elements in information processing apparatus 1300 is cut off. RAM 1340 stores a main FAT 1341 used in updating FATs on information recording medium 360, and open file information1343 that exists for each file targeted for updating. Main FAT 1341 shows the storage locations of data on medium 360; that is, in which clusters the various pieces of data are stored.

Open file information 1343 includes entry information 1344, a processing status 1345, and recovery information 1346. Here, entry information 1344 is the same as entry information 344. Processing status 1345 shows the stage reached in the update processing. In other words, it is information showing which of a plurality of procedures that form the update processing have been executed. Processing status 1345 changes sequentially with the completion of each procedure in the file-updating process, and is referred to during recovery processing performed to resolve inconsistencies in file management information arising when the updating of files is interrupted partway through.

Recovery information 1346 is necessary for recovering files, and is formed from the cluster number of the first cluster that stores data constituting the content of a file after updating (hereinafter, "new link starting cluster number"), and the cluster number of the first cluster that stores data constituting the content of the file before updating (hereinafter, "update starting cluster number").

Operations

The operations of information processing apparatus 1300 will now be described.

In the event of an abnormal termination caused by a power-down or the like having occurred before the completion of file updating when information processing apparatus 1300 was last operational, apparatus 1300 commences recovery processing (described below) performed as a result of CPU 310 executing file-processing program 1331, when power is supplied from main power source 320 in response, for example, to a user depressing a power-on button; that is, when apparatus 1300 is booted. Apparatus 1300 then conducts setup processing with information recording medium 360 mounted therein, before moving on to conduct update processing (described below) on individual files.

Setup processing involves copying FAT 363 on information recording medium 360 into main FAT 1341 in RAM 1340, and nullifying the content of all open-file information.

As a result of the setup processing, RAM 1340 stores a main FAT that is identical to FAT 363, and open-file information that has been nullified. The storage of nullified open-file information indicates that effective open-file information does not exist.

The following description relates to update processing realized in information processing apparatus 1300 by executing part of file-processing program 1331.

Figure 21:
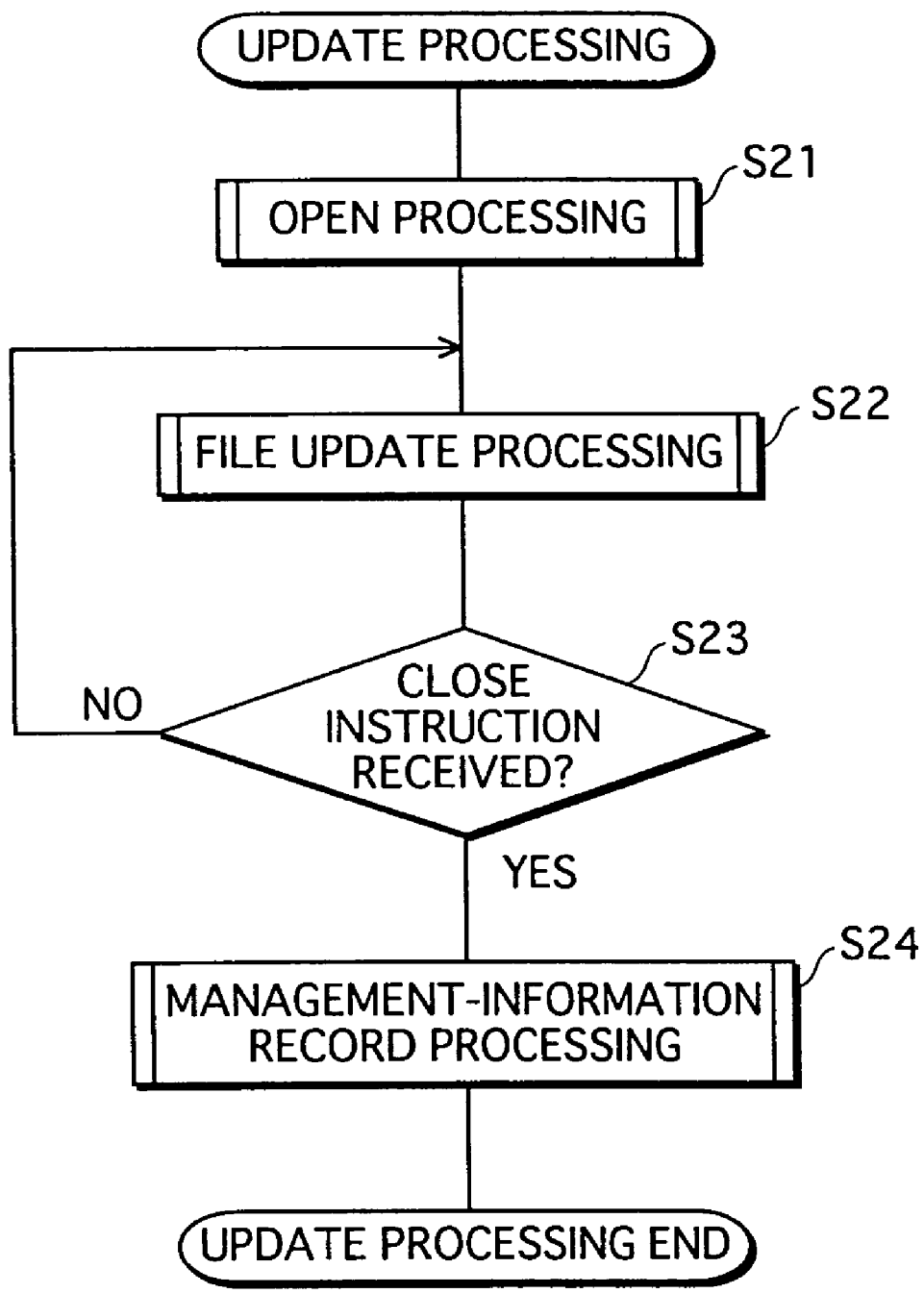
FIG. 21 is a flowchart showing an overview of update processing conducted by information processing apparatus 1300.

FIG. 21 is a flowchart showing an overview of update processing conducted by information processing apparatus 1300.

Update processing is executed independently on individual files targeted for updating, and is assumed to be executable concurrently on a plurality of files. File-processing program 1331 performs update processing when the updating of a file is requested during execution of application or system programs.

Information processing apparatus 1300 firstly executes open processing (step S21), file-update processing, which includes the recording of post-update data onto information recording medium 360 in response to the updating of a file, until the receipt of a close instruction (step S22, S23), and management-information record processing, which is for recording information for managing storage locations of post-update file data onto information recording medium 360 (step S24).

The following is a detailed description of the steps S21, S22, S24 processing, while referring to the file "FILE1.TXT" updating example given in embodiment 1.

Figure 22:
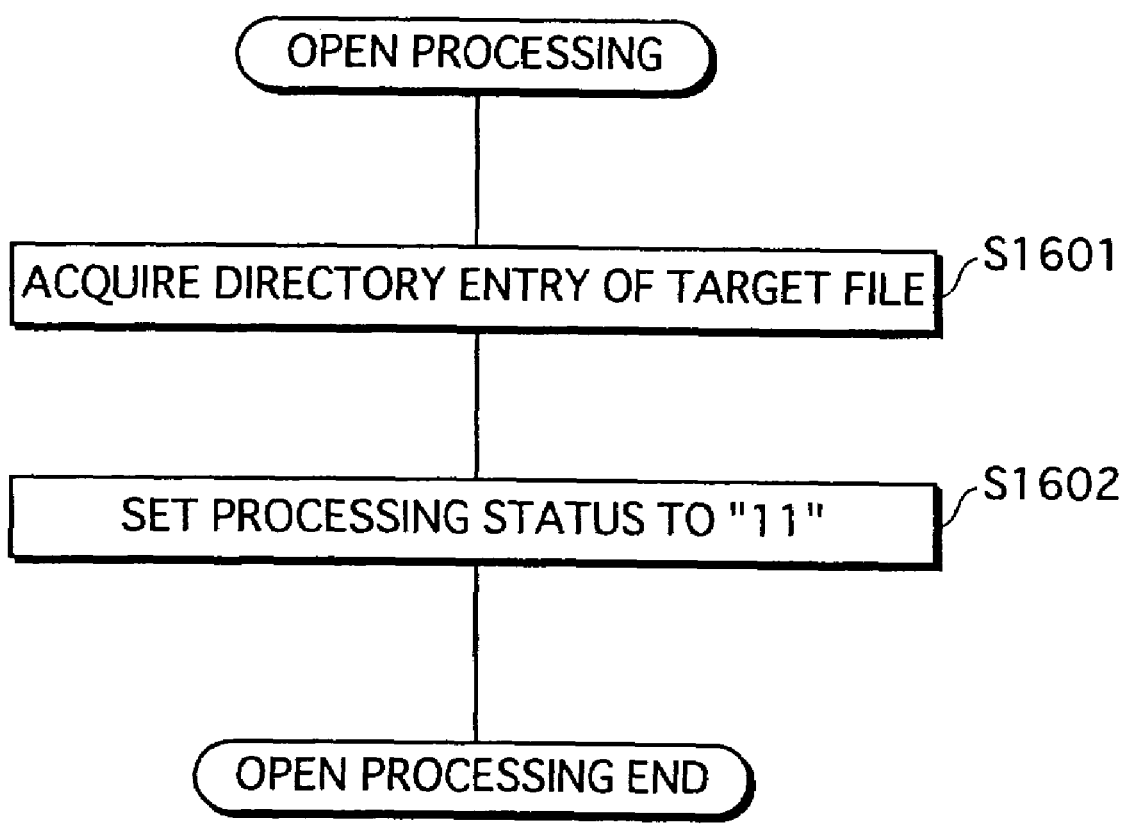
FIG. 22 is a flowchart of open processing conducted by information processing apparatus 1300.

FIG. 22 is a flowchart of the open processing conducted by information processing apparatus 1300.

Information processing apparatus 1300 firstly acquires the directory entry relating to the file targeted for updating from information recording medium 360, and records the acquired directory entry as the entry information of open-file information in RAM 1340 that relates to the targeted file (step S1601). In other words, the file name FILE1.TXT, the update starting cluster number, and the file size are set in the entry information of a corresponding piece of open-file information.

Apparatus 1300 then sets the processing status in the open-file information relating to the targeted file to "11" (step S1602), and ends the open processing.

Figure 23:
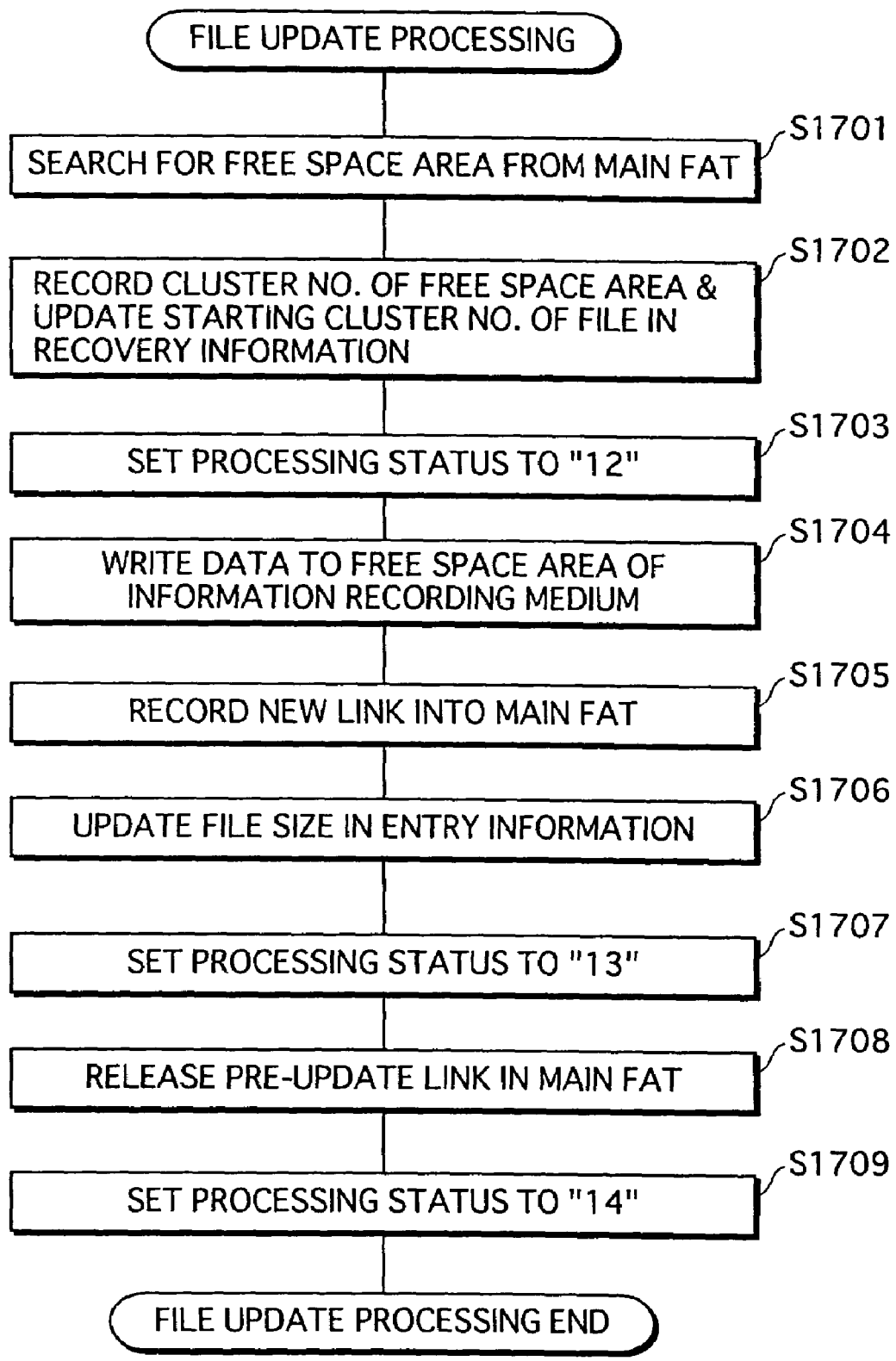
FIG. 23 is a flowchart of file-update processing conducted by information processing apparatus 1300.

FIG. 23 is a flowchart of the file-update processing conducted by information processing apparatus 1300.

Information processing apparatus 1300 refers to the file size recorded as entry information in the open-file information, and searches main FAT 1341 in RAM 1340 for a free space area capable of accommodating this file size in data area 366 (step S1701). In the search at step S1701, apparatus 1300 judges a cluster having a "0" FAT entry in main FAT 1341 to be a free space area.

Following step S1701, information processing apparatus 1300 records the new link starting cluster number (i.e. cluster number to which the first retrieved free space area corresponds) and the update starting cluster number of the file into the recovery information of the open-file information (step S1702), and sets the processing status to "12" (step S1703). At step S1702, the new link starting cluster number is also set as the starting cluster number in the entry information.

Following step S1703, information processing apparatus 1300 writes data constituting the post-update file content into the free-space area in data area 366 of information recording medium 360 (step S1704), updates the main FAT to show the links of the clusters written with the data (step S1705), updates the file size in the entry information to show the file size of the written data (step S1706), and sets the processing status to "13" (step S1707).

After step S1707, information processing apparatus 1300 releases the links showing the clusters that stored the pre-update file data from the main FAT in RAM 1340 (step S1708), sets the processing status to "14" (step S1709), and ends the file-update processing.

Figure 24:
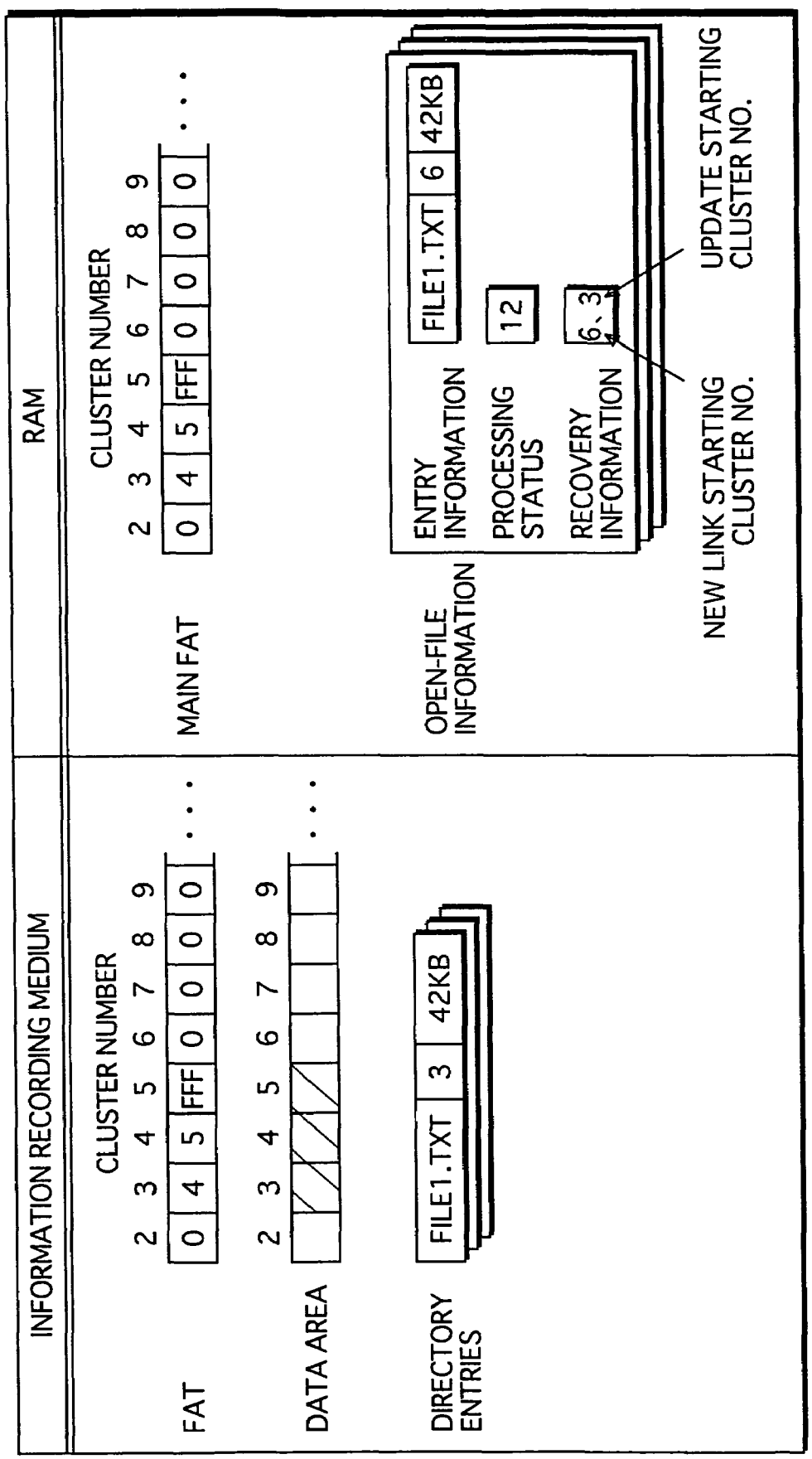
FIG. 24 illustrates a data state after completion of step S1703 of the file-update processing.

FIG. 24 illustrates a data state after the completion of step S1703 of the file-update processing.

AS shown in the exemplary content of information recording medium 360 given in FIG. 24, data constituting the targeted file on medium 360 is stored in the $3^{rd}$, $4^{th}$ and $5^{th}$ clusters of data area 366. The filename of this file is "FILE1.TXT", and the file size is 42 KB.

As shown in FIG. 24, the cluster number "3" of the head cluster storing the pre-update file data has been set in the recovery information of the open-file information relating to the file "FILE1.TXT" as the update starting cluster number, and the cluster number "6" of the head cluster scheduled to store the post-update file data (i.e. cluster retrieved as an free empty space at step S1701) has been set as the new link starting cluster number. The processing status has been set to "12".

Figure 25:
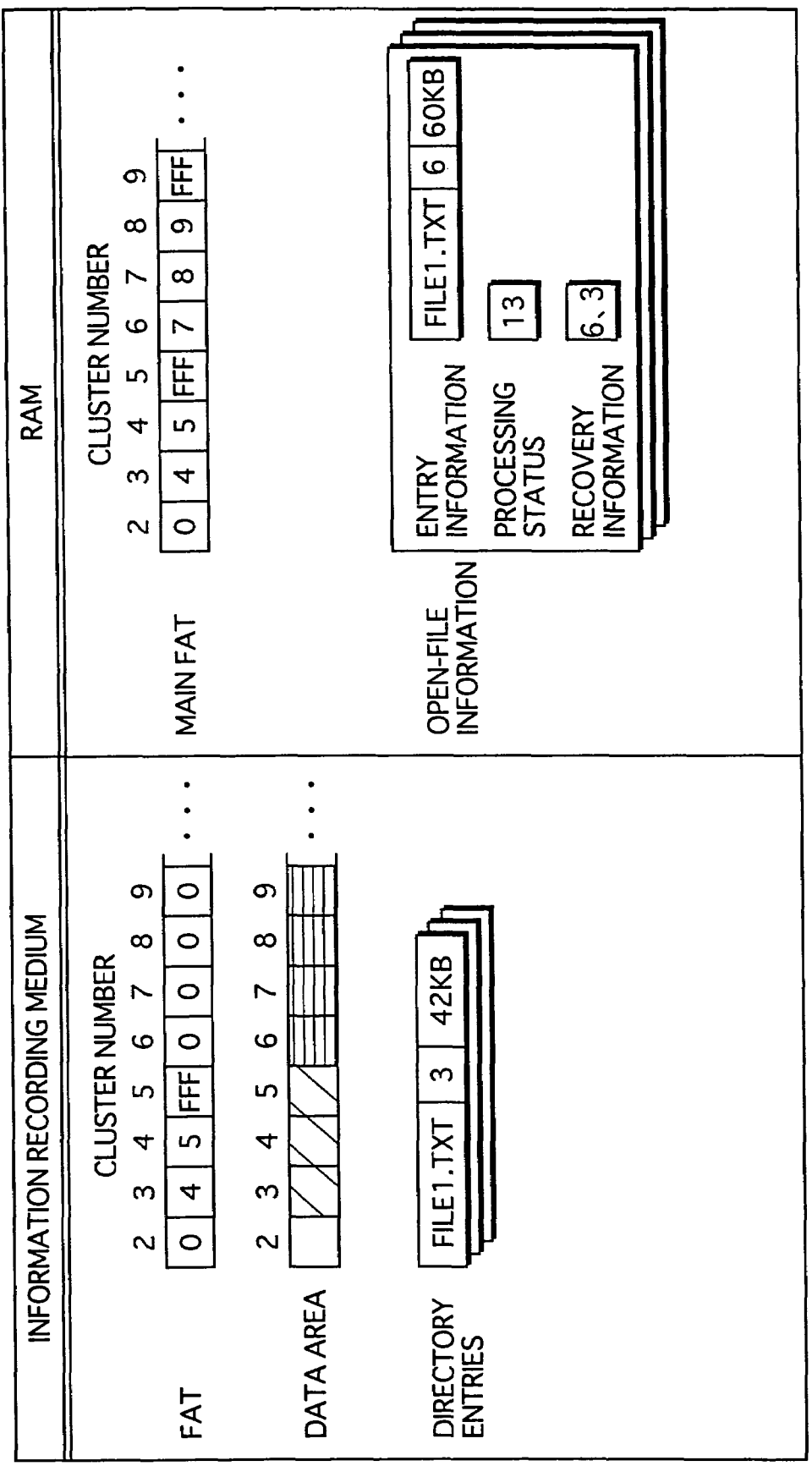
FIG. 25 illustrates a data state after completion of step S1707 of the file-update processing.

FIG. 25 illustrates a data state after the completion of step S1707 of the file-update processing. The state depicted in FIG. 25 follows that in FIG. 24.

As shown in FIG. 25, the post-update file data has been recorded in the $6^{th}$ to $9^{th}$ clusters on information recording medium 360, and in response to this, values showing the $6^{th}$ to $9^{th}$ clusters to be linked has been set in the $6^{th}$ to $9^{th}$ FAT entries in the main FAT as a result of step S1705. In addition, the file size in the entry information has been updated to 60 KB as a result of step S1706, and the processing status has been set to "13" as a result of step S1707. file-update processing. The state depicted in FIG. 26 follows FIG. 26 illustrates a data state after completion of the that in FIG. 25.

Figure 26:
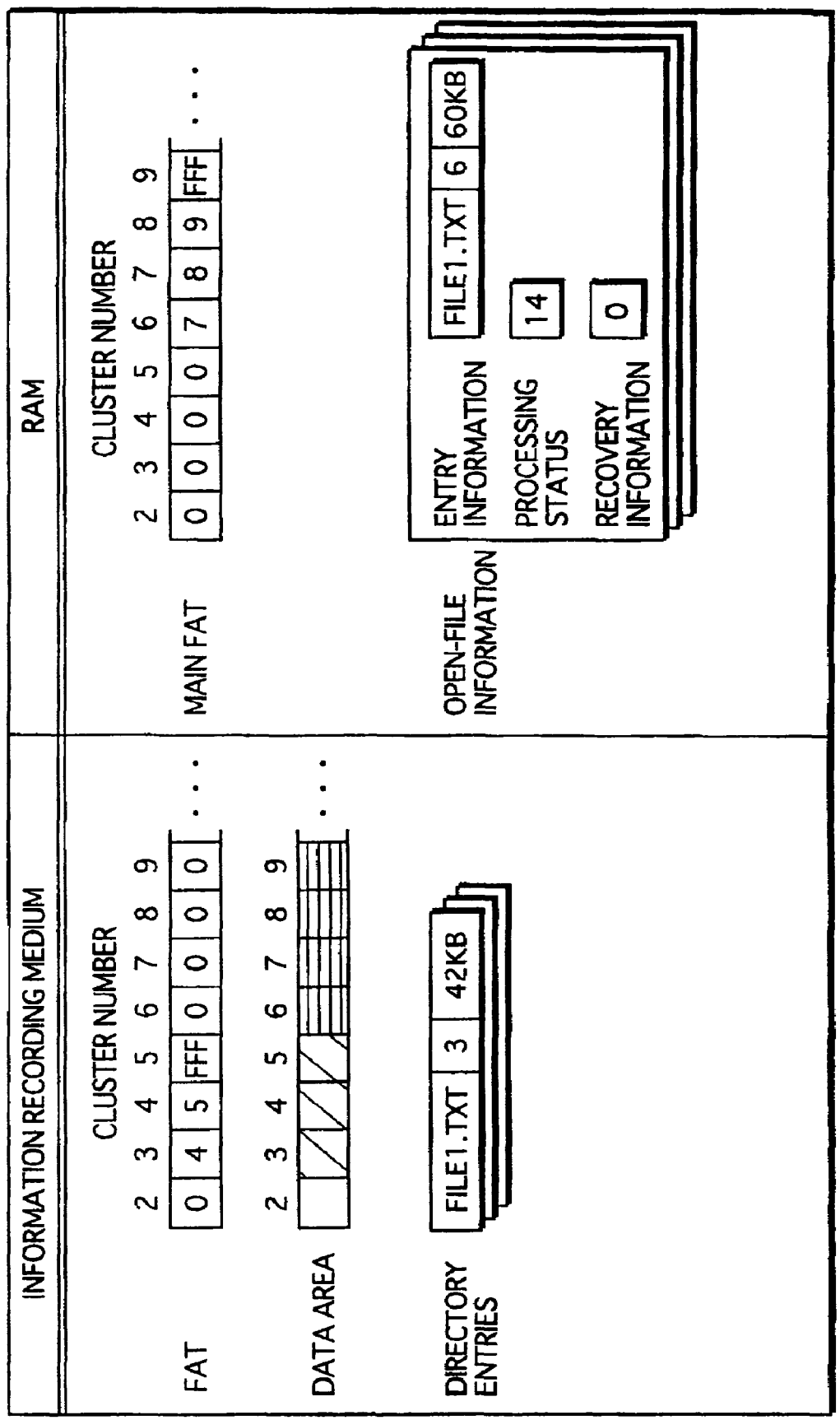
FIG. 26 illustrates a data state after completion of the file-update processing.

As shown in FIG. 26, links relating to the clusters storing pre-update file data have been released from the main FAT as a result of step S1708; that is, the content of the FAT entries in the main FAT that correspond to the $3^{rd}$, $4^{th}$ and $5^{th}$ clusters have been cleared. The processing status has been set to "14".

Information processing apparatus 1300 conducts the release of links in the main FAT by clearing the link information in a FAT entry after firstly storing this link information and the cluster number of the FAT entry in the recovery information. This enables the release of links in the main FAT to be conducted correctly, even if the update processing stops during the release of these links. Consider an example in which the links of FAT entries corresponding to cluster numbers 3, 4 and 5 are released. After storing "3,4" in the recovery information, apparatus 1300 sets the FAT entry corresponding to cluster number 3 in the FAT on information recording medium 360 to "0" (i.e. showing free space area). Then, after changing the recovery information to "4,5", apparatus 1300 sets the FAT entry corresponding to cluster number 4 in the FAT to "0". Finally, after setting the recovery information to "5, 0xFFF", apparatus 1300 sets the FAT entry corresponding to cluster number 5 in the FAT to "0", and sets the recovery information to "0". By releasing links in the main FAT according to this procedure it is possible, even if update processing is suspended during the release of links, to proceed with the release process when the recovery processing is next conducted. As a result of releasing links according to this procedure, the recovery information shown in FIG. 26 has been set to "0".

Figure 27:
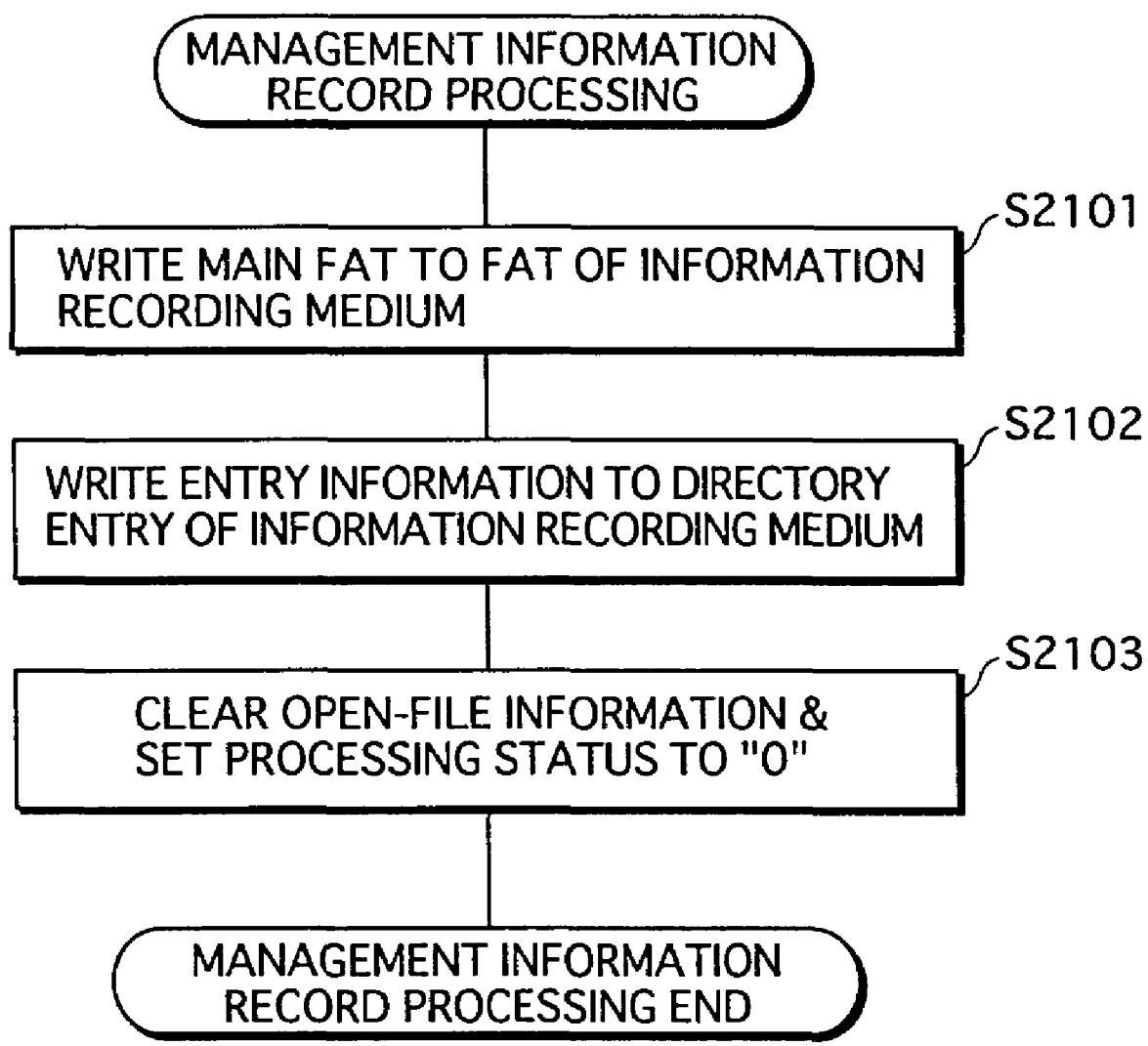
FIG. 27 is a flowchart of management-information record processing conducted by information processing apparatus 1300.

FIG. 27 is a flowchart of the management-information record processing conducted by information processing apparatus 1300.

As shown in FIG. 27, information processing apparatus 1300 firstly updates the FAT on information recording medium 360 by copying the main FAT into the FAT (step S2101). Here, the "FAT" into which the main FAT is copied refers specifically to both FATs 1 and 2. Following the updating of the FAT, apparatus 1300 conducts writing so that the entry information included in the open-file information in RAM 1340 that relates to the file is reflected in the directory information of the corresponding file on medium 360 (step S2102). Apparatus 1300 then clears the open-file information and sets the processing status to "0" (step S2103), before ending the processing.

The following description relates to recovery processing realized in information processing apparatus 1300 by executing part of file-processing program 1331.

Figure 28:
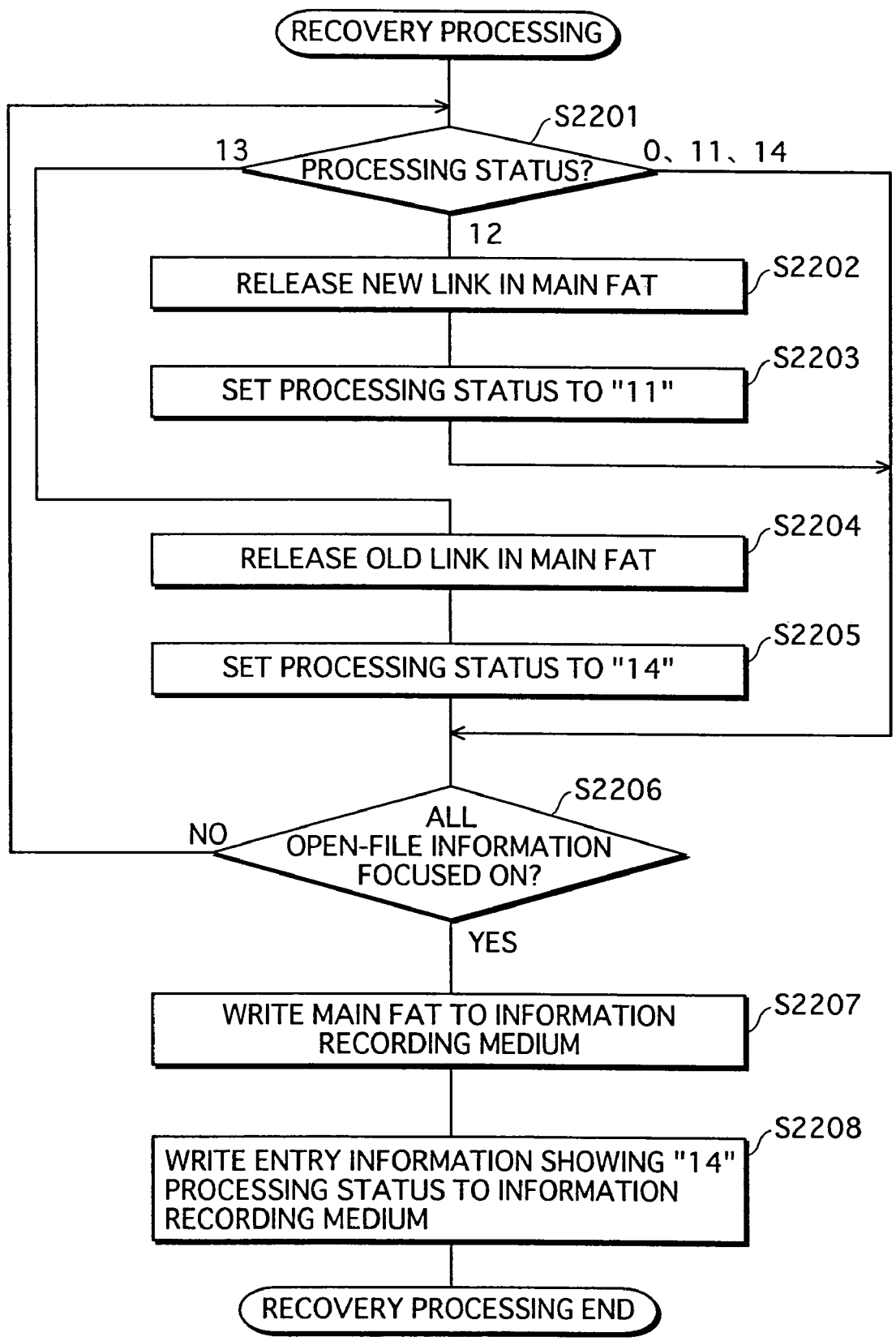
FIG. 28 is a flowchart of recovery processing conducted by information processing apparatus 1300.

FIG. 28 is a flowchart of the recovery processing conducted by information processing apparatus 1300.

On commencement of the recovery processing, information processing apparatus 1300 firstly focuses sequentially on each piece of open-file information held in RAM 1340, and judges the processing status included therein (step S2201).

Depending on the result of this judgment, apparatus 1300 conducts step S2202, S2204 or S2206.

If the processing status is judged to be "12" at step S2201, information processing apparatus 1300 refers to the new link starting cluster number in the recovery information of the open-file information focused on, and releases the links starting from the FAT entry in main FAT 1341 that corresponds to the new link starting cluster number (step S2202), before setting the processing status to "11" (step S2203).

Here, information processing apparatus 1300 overwrites the link information in a FAT entry in the main FAT with "0", after firstly updating the new link starting cluster number in the recovery information and storing the link information and cluster number of the FAT entry in the recovery information. This enables the release of links in the main FAT at step S2202 to be recommenced correctly, even if the update processing stops during the release of these links. Consider an example in which the links of FAT entries corresponding to cluster numbers 3, 4 and 5 are released. After storing "3,4" in the recovery information, apparatus 1300 sets the FAT entry corresponding to cluster number 3 in the main FAT to "0" (i.e. showing free space area). Then, after changing the recovery information to "4,5", apparatus 1300 sets the FAT entry corresponding to cluster number 4 in the FAT to "0". Finally, after setting the recovery information to "5, 0xFFF", apparatus 1300 sets the FAT entry corresponding to cluster number 5 in the FAT to "0", and sets the recovery information to "0". By releasing links in the main FAT according to this procedure it is possible, even if update processing is suspended during the release of links, to proceed with the release processing when the recovery processing is next conducted.

If the processing status is judged at step S2101 to be "13", apparatus 1300 refers to the update starting cluster number in the recovery information of the open-file information focused on, and releases the links starting from the FAT entry in main FAT 1341 that corresponds to the update starting cluster number (step S2204), before setting the processing status to "14" (step S2205). As in step S2202, apparatus 1300 releases links in the main FAT by overwriting the link information in a FAT entry in the main FAT with "0", after firstly updating the update starting cluster number in the recovery information and storing the link information and cluster number of the FAT entry in the recovery information.

After completing step S2203 or S2205, or if the processing status in the open-file information focused on is judged at step S2201 to be one of "0", "11" or "14", information processing apparatus 1300 judges whether all of the open-file information has been focused on (step S2206). If there is still open-file information that has not been focused on, apparatus 1300 focuses on this open-file information and returns to step S2201 to repeat the processing. When all of the open-file information has been focused on, apparatus 1300 copies the content of the main FAT in RAM 1340 into FATs 1 and 2 on information recording medium 360 (step S2207).

Following step S2207, information processing apparatus 1300 retrieves, from among all of the open-file information, those pieces whose processing status is "14", and conducts writing so that the entry information in all of the retrieved open-file information is reflected in the directory entries of corresponding files on information recording medium 360 (step S2208). Apparatus 1300 then clears all of the open-file information and ends the recovery processing.

As a result of the above recovery processing, files are recovered to a post-update state if the post-update file data has been recorded onto information recording medium 360, and information relating to the storage locations of the data is held in RAM 1340; that is, after these storage location are expressed in the main FAT and the entry information. In all other cases, recovered files are returned to a pre-update state. Moreover, information processing apparatus 1300 focuses on individual pieces of open-file information and recovers files separately in accordance with their respective processing status. Thus, even if a plurality of files is updated concurrently, it is possible to appropriately recover files according to respective stages reached in the update processing; that is, to conduct re-updating so as to eliminate inconsistencies relating to FATs and directory entries for managing files.

Embodiment 3

The following description relates to an information processing apparatus (hereinafter, "composite information processing apparatus") that selectively applies, in file-sized units, a combination of the file update and recovery functions conducted by information processing apparatuses 300 and 1300 of embodiments 1 and 2 above.

The composite information processing apparatus includes a combination of the elements of information processing apparatuses 300 and 1300.

With the composite information processing apparatus, it is assumed that when individual files are targeted for updating (i.e. opened), one of two types of processing is specified by an application program or system program that reflects a user operation or the like. In the first type, updating is not effective prior to a targeted file being closed, as described in embodiment 1. In the second type, updating is effective, even prior to a targeted file being closed, as described in embodiment 2. The apparatus, according to the type selected, implements the update processing shown in either FIG. 7 or FIG. 21. It should be noted that step S1701 of the file-update processing (see FIG. 23) of the FIG. 21 update processing has been modified slightly. In embodiment 3, the search for a free space area involves the sub FAT as well as the main FAT.

The following description relates to recovery processing realized in the composite information processing apparatus by executing a file-update program.

Figure 29:
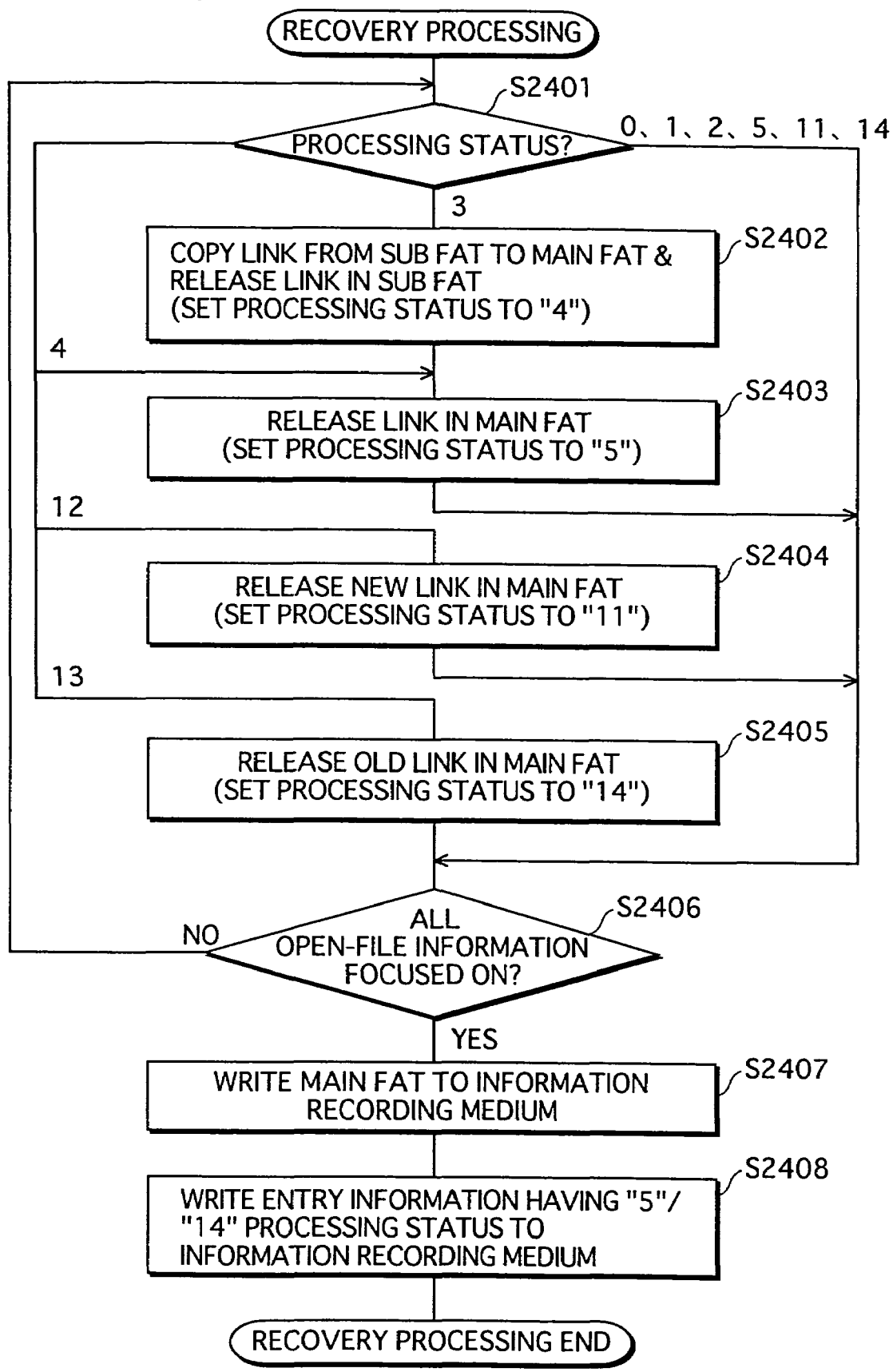
FIG. 29 is a flowchart of recovery processing conducted by a composite information processing apparatus.

FIG. 29 is a flowchart of the recovery processing conducted by the composite information processing apparatus.

On commencement of the recovery processing, the composite information processing apparatus firstly focuses sequentially on each piece of open-file information held in RAM, and judges the processing status included therein (step S2401). Depending on the result of this judgment, the apparatus conducts step S2402, S2403, S2404, S2405 or S2406.

If the processing status is judged to be "3" at step S2401, the composite information processing apparatus searches the sub FAT for links that start from the FAT entry corresponding to the starting cluster number in the entry information of the open-file information focused on, and continue until a FAT entry containing "0xFFF", and copies the content of these FAT entries into the FAT entries corresponding to the same clusters in the main FAT. The apparatus then clears the content of these FAT entries in the sub FAT, and sets the processing status to "4" (step S2402).

If the processing status is judged at step S2401 to be "4", or if step S2402 has been executed, the composite information processing apparatus obtains the starting cluster number of pre-update file data shown in the recovery information of the open-file information focused on, clears the values of all FAT entries linked from the FAT entry in the main FAT that corresponds to the obtained starting cluster number to release the links, and sets the processing status to "5" (step S2403).

If the processing status is judged at step S2401 to be "12", the composite information processing apparatus refers to the new link starting cluster number in the recovery information of the open-file information focused on, releases the links starting from the FAT entry in the main FAT that corresponds to the new link starting cluster number, and sets the processing status to "11" (step S2404).

If the processing status is judged at step S2401 to be "13", the composite information processing apparatus refers to the update starting cluster number in the recovery information of the open-file information focused on, releases the links starting from the FAT entry in the main FAT that corresponds to the update starting cluster number, and sets the processing status to "14" (step S2405).

After completing step S2403, S2405 or S2405, or if the processing status in the open-file information focused on is judged at step S2401 to be one of "0", "1", "2", "5", "11" or "14", the composite information processing apparatus judges whether all of the open-file information has been focused on (step S2406). If there is still open-file information that has not been focused on, the apparatus focuses on this open-file information and returns to step S2401 to repeat the processing. When all of the open-file information has been focused on, the apparatus copies the content of the main FAT in RAM into FATs 1 and 2 on information recording medium 360 (step S2407).

Following step S2407, the composite information processing apparatus retrieves, from among all of the open-file information, those pieces whose processing status is "5" or "14", and conducts writing so that the entry information in all of the retrieved open-file information is reflected in the directory entries of corresponding files on information recording medium 360 (step S2408). The apparatus then clears all of the open-file information and ends the recovery processing.

Embodiment 4

Apparatus and Data Structure

Figure 30:
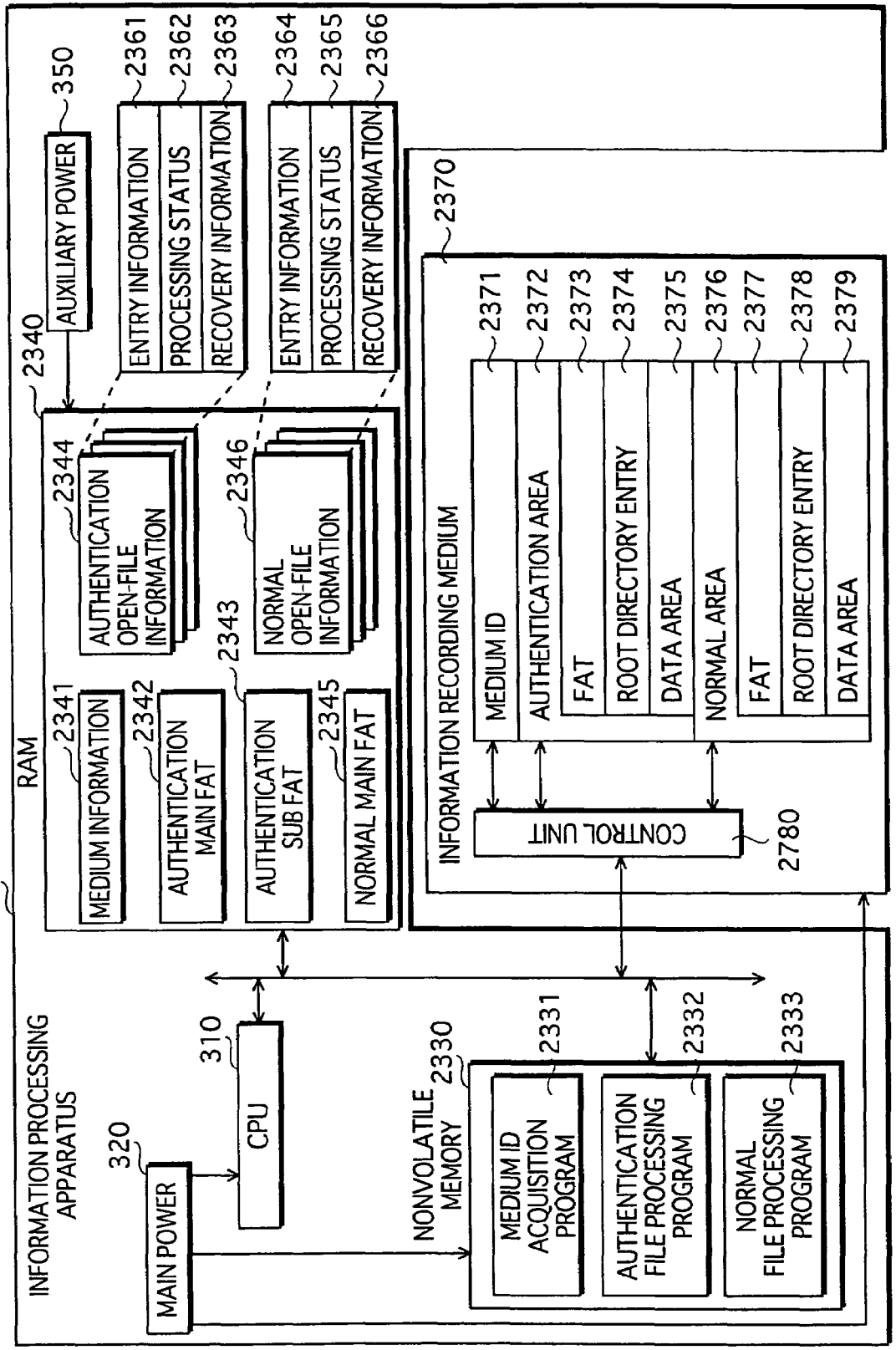
FIG. 30 is a structural diagram of an information management apparatus 2300 pertaining to an embodiment 4 of the present invention.

FIG. 30 shows the structure of an information processing apparatus pertaining to embodiment 4 of the present invention.

Information processing apparatus 2300 pertaining to embodiment 4 is, for example, a PDA, a mobile telephone or the like. Apparatus 2300 includes a slot for mounting an information recording medium 2370 (e.g. semiconductor memory card such as an SD memory card, etc.), and functions to edit and update files on the mounted medium 2370. Here, the SD (secure digital) memory card is technology jointly developed and specified by Panasonic (Matsushita Electric Industrial Co., Ltd.), SanDisk (SanDisk Corporation), and Toshiba (Toshiba Corporation).

Information recording medium 2370 mounted in information processing apparatus 2300 includes a medium identifier (medium ID) 2371, and has an authentication area 2372 and a normal area 2376. Medium 2370 also has a control unit 2780 that conducts controls relating to mutual authentication conducted with external devices and the receipt of data. The authentication area is an area for storing files and so forth that are required in conducting mutual authentication with apparatus 2300. Predetermined access restrictions apply to this area. The normal area, which is used for purposes other than authentication, is an area for storing files constituted by image, audio and other data. Predetermined access restrictions do not generally apply to this area.

Data recorded in both authentication area 2372 and normal area 2376 is managed using a FAT file system. Authentication area 2372 includes a FAT 2373, a root directory entry 2374, and a data area 2376. Normal area 2376 includes a FAT 2377, a root directory entry 2378, and a data area 2379.

As shown in FIG. 30, information processing apparatus 2300 includes a CPU 310, a main power source 320, a nonvolatile memory 2330, a RAM 2340 and an auxiliary power source 350. Although not depicted, apparatus 2300 also includes an input interface for receiving user operations via keys, buttons and the like, a monitor for presenting information to a user, and so forth. In FIG. 30, elements of apparatus 2300 that are the same as those of information processing apparatus 300 are shown using the same reference numerals. A detailed description of these elements is omitted here.

Nonvolatile memory 2330 is a memory storing computer programs operated under the control of CPU 310. In particular, memory 2330 stores a medium-ID acquisition program 2331 for acquiring from information recording medium 2370 a medium ID unique to the medium, an authentication-file processing program 2332 for realizing processing related to updating and recovery of files in the authentication area, and a normal-file processing program 2333 for realizing processing related to updating and recovery of files in the normal area. Memory 2330 also stores application and system programs, and the like (not depicted).

RAM 2340 is a memory that receives a continuous supply of power from auxiliary power source 350 (battery, etc.), and constantly holds data. RAM 2340 continues to hold data even if, for example, power supply from main power source 320 to the elements in information processing apparatus 2300 is cut off.

RAM 2340 stores: medium information 2341 in which a medium ID acquired from information recording medium 2370 by medium-ID acquisition program 2331 is set as a value; an authentication main FAT 2342 showing the physical storage locations of data in the authentication area; an authentication sub FAT 2343 showing the physical storage locations of data newly recorded in the authentication area as a result of file updating; a normal main FAT 2345 used in updating data in the normal area; authentication open-file information 2344 that exists for each file in the authentication area targeted for updating; and normal open-file information 2346 that exists for each file in the normal area targeted for updating. FATs 2342, 2343 and 2345 show storage locations of data on information recording medium 2370 in cluster units.

Authentication open-file information 2344 has the same data format as open-file information 343 described in embodiment 1, and includes entry information 2361, a processing status 2362, and recovery information 2363. Normal open-file information 2346 has the same data format as open-file information 1343 described in embodiment 2, and includes entry information 2364, a processing status 2365, and recovery information 2366.

Operations

The operations of information processing apparatus 2300 will now be described.

In the event of an abnormal termination caused by a power-down or the like having occurred before the completion of file updating when information processing apparatus 2300 was last operational, apparatus 2300 commences recovery processing (described below) performed as a result of CPU 310 executing various programs, when power is supplied from main power source 320 in response, for example, to a user depressing a power-on button; that is, when apparatus 2300 is booted. Apparatus 2300 then conducts setup processing with information recording medium 2370 mounted therein, before moving on to conduct update processing on individual files.

The setup processing involves information processing apparatus 2300 firstly executing medium-ID acquisition program 2331 using CPU 310 when information recording medium 2370 is mounted therein. As a result of the execution of program 2331, apparatus 2300 conducts mutual authentication in accordance with authentication procedures predetermined between apparatus 2300 and control unit 2780 of medium 2370. If authentication is successful (i.e. if the relation between a legitimate information processing apparatus and a legitimate information recording medium is satisfied), apparatus 2300 acquires medium ID 2371 on medium 2370 via control unit 2780, and stores the acquired medium ID 2371 in RAM 2340 as medium information 2341. Next, apparatus 2300 copies FAT 2373 on medium 2370 into authentication main FAT 2342 in RAM 2340, copies FAT 2377 on medium 2370 into normal main FAT 2345 in RAM 2340, and nullifies the content of all of the authentication open-file information and normal open-file information.

When a file in the authentication area is targeted for updating, the update processing involves information processing apparatus 2300 conducting the same processing as the update processing described in embodiment 1. This is achieved by executing authentication-file processing program 2332, using authentication main FAT 2342, authentication sub FAT 2343 and authentication open-file information 2344 (see FIGS. 7, 8, 10, 12, 17). Here, authentication main FAT 2342 corresponds to main FAT 341, authentication sub FAT 2343 corresponds to sub FAT 342, and authentication open-file information 2344 corresponds to open-file information 343.

When a file in the normal area is targeted for updating, the update processing involves information processing apparatus 2300 conducting the same processing as the update processing described in embodiment 2. This is achieved by executing normal-file processing program 2333, using normal main FAT 2345 and normal open-file information 2346 (see FIGS. 21-23, 27). Here, normal main FAT 2345 corresponds to main FAT 1341, and normal open-file information 2346 corresponds to open-file information 1343.

The following description relates to recovery processing executed in information processing apparatus 2300.

Recovery processing is executed after the resumption of power supply from the main power source in the event of file updating having been suspended partway through as a result of power supply from the main power source being cut off, for example. Power supply may be resumed, for example, when a user turns power on after a battery (main power source) has been recharged.

Figure 31:
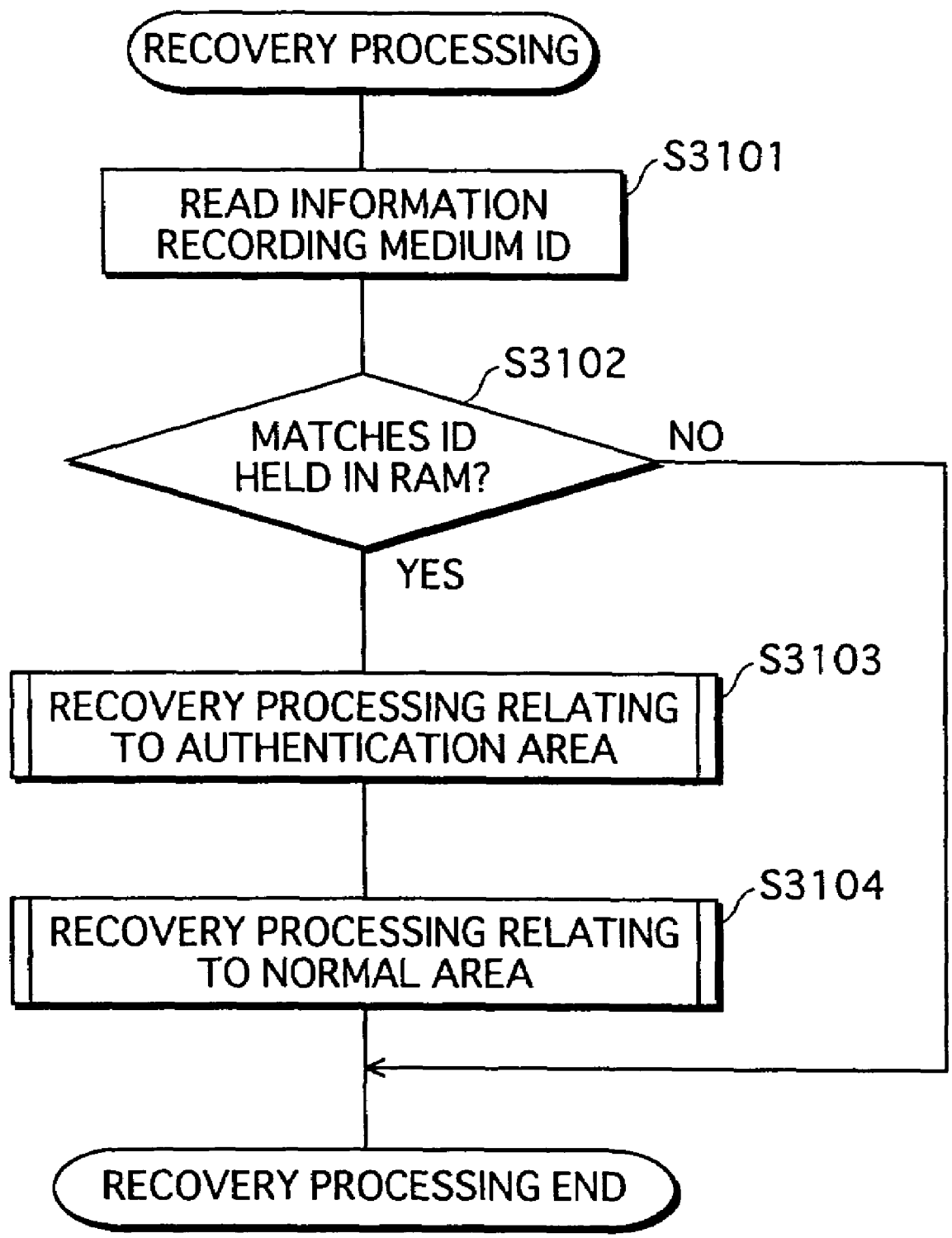
FIG. 31 is a flowchart of recovery processing conducted by information processing apparatus 2300.

FIG. 31 is a flowchart of the recovery processing conducted by information processing apparatus 2300.

On commencement of the recovery processing, information processing apparatus 2300 firstly reads a medium ID from information recording medium 2370 via control unit 2780 (step S3101), and compares the read medium ID with medium information 2341 stored in RAM 2340 as a result of the setup processing executed last time apparatus 2300 was operational (i.e. prior to the power-down, etc.) at step S3102. If the read medium ID does not match medium information 2341, this indicates that the information recording medium currently mounted is different from the information recording medium with which file updating was conducted last time. In this case, the recovery processing is ended without conducting file recovery.

If judged at step S3102 that the read medium ID matches medium information 2341, information processing apparatus 2300 executes part of authentication-file processing program 2332 to perform recovery processing on files in the authentication area (step S3103). The recovery processing conducted at step S3103 is the same as the recovery processing described in embodiment 1 (see FIG. 19).

Following step S3103, information processing apparatus 2300 executes part of normal-file processing program 2333 to implement recovery processing on files in the normal area (step S3104). The recovery processing conducted at step S3104 is the same as the recovery processing described in embodiment 2 (see FIG. 28).

Variations

The following description relates a variation of the recovery processing conducted by the information processing apparatuses shown in embodiments 1 to 4.

FIG. 32 is a flowchart of recovery-select processing, which is a variation of the recovery processing.

The recovery processing shown in embodiments 1 to 4 can be replaced by the recovery-select processing shown in FIG. 32.

An information processing apparatus pertaining to the present variation (hereinafter, "variation information processing apparatus") judges for each piece of open-file information in RAM, whether the processing status is "0" (steps S3201 to S3203). If all of the open-file information has a "0" processing status, this indicates that there has been no suspension of the update processing partway through. In this case, the apparatus ends the processing.

If there is even one piece of open-file information having a processing status other than "0", the variation information processing apparatus displays a message on the monitor showing that information for recovery exists (step S3204). The apparatus then displays a message on the monitor that makes the user select whether to execute the recovery or discharge the recovery information, and receives a user selection (step S3205). Here, the recovery information refers to the main FAT and open-file information in RAM, and to the sub FAT if one exists.

If the received selection indicates to conduct recovery (step S3206=YES), the variation information processing apparatus executes the recovery processing shown in the above embodiments (step S3207), and ends the recovery-select processing. If the received selection indicates to discard the recovery information (step S3206=NO), the apparatus clears the recovery information (step S3208), and ends the recovery-select processing.

Since this recovery-select processing allows a user to select whether or not to execute recovery, it is possible for the user to halt the execution of recovery processing in cases in which, for example, an information recording medium at the time of recovery is different from the information recording medium at the time of updating, or the information recording medium at the time of updating has been rewritten by a different information processing apparatus from the one that originally conducted update processing, before being remounted in the original information processing apparatus. In other words, these are cases in which the recovery processing will not function effectively.

Supplement

While file-update apparatuses pertaining to the present invention have been described above based on the embodiments, the present invention is, of course, not limited to these embodiments. The following description relates to variations of the above embodiments.

(1) In the example given in embodiment 1, even if the updating of a file has been completed, the updating of FATs and directory entries on an information recording medium so as to show the location of the post-update file data is not performed prior to a close instruction being received. However, as long as sub FAT information and open-file information in RAM shows the location of post-update file data, FATs and directory entries on the information recording medium may, as part of the update processing, be updated prior to the receipt of a close instruction, so as to show the location of the post-update file data. And even if update processing is interrupted prior to the receipt of a close instruction, the user may, as part of the recovery processing, be made to select whether or not to update FATs and directory entries on the information recording medium, and recovery may be conducted in response to the user selection.

(2) Main power source 320 shown in embodiment 1 is not limited to being a rechargeable battery, and may be structured to supply power acquired from a household wall socket to the elements in information processing apparatus 300 and information recording medium 360. Also, auxiliary power source 350, if able to receive supply of power independently of main power source 320, is not limited to being a primary battery.

(3) Although the file updating and recovery methods shown in the above embodiments related to the use of a FAT file system, the file system is not limited to being a FAT file system. It is possible to use the same file updating and recovery methods with a FAT32 file system or the like, for example. Also, the storage capacity of the information recording medium is not limited to 64 MB, nor is the size of a single cluster limited to 16 KB. Furthermore, although a FAT entry value of "0" is used to show an unused cluster, this may be indicated by numerical values other than "0". Likewise, although "0xFFF" is used to shows the termination of a link, this may be indicated by numerical values other than "0xFFF".

(4) In the above embodiments, recovery information (i.e. information necessary for recovering files) is held in RAM to which power is constantly supplied by the auxiliary power source. However, as long as held recovery information is not lost even if power supply from the main power source is cut off, recovery information may be held in other types of memory (e.g. nonvolatile memory, etc.).

The information recording medium may be flash memory. In particular, if the information recording medium is flash memory, and the memory storing recovery information is accessible faster than flash memory, it is possible, when updating files on flash memory, to greatly reduce the time needed to record information useful only for recovery.

(5) In embodiment 2, updating is conducted by overwriting from the head of a file (see FIG. 23). However, the same procedures can be conducted, even when arbitrary locations in a file are overwritten, or when data is added to a file.

Also, in embodiment 2, a free space area for writing new data is acquired and the new data written into this free space area. However, when it does not matter if old data is destroyed, new data may be written directly over old data without acquiring free space areas once the file-update processing has begun.

(6) In embodiment 4, the information processing apparatus uses medium IDs acquired from information recording media to judge whether a medium mounted at the time of recovery is the same as the medium mounted at the time of updating. However, the present invention is not limited to the use of medium IDs unique to individual information recording media. The apparatus may judge whether media are the same using hash values or the like of information stored in specific locations on the media.

(7) The processing procedures (i.e. those shown in the FIG. 7 flowchart, etc.) conducted by the information processing apparatuses described in embodiments 1 to 4 and the variation can also be circulated or distributed via a variety of communication channels or the like, or by recording a computer program for execution by a computer or the like onto a recording medium. This recording medium may be an IC card, an optical disk, a flexible disk, a ROM, or the like. A circulated/distributed computer program may be installed, for example, for use on a computer or the like, and by executing the computer program the computer or the like can conduct processing such as the updating, recovery and recovery-select processing shown in embodiments 1 to 4 and the variation.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A file-update apparatus which is able to mount a removable first recording medium, and execute a plurality of update procedures to update a file on the first recording medium, said file-update apparatus comprising:

a second recording medium;

a progress recording unit operable to record, onto said second recording medium, progress information showing which of the plurality of update procedures have been executed in updating the file;

a new-data recording unit operable to record, onto the first recording medium, data constituting a content of the file after updating the file, in a different storage location from data constituting a content of the file before updating the file;

an update information recording unit operable to record, onto said second recording medium, update information showing the storage location, on the first recording medium, of the data constituting the content of the file after updating the file;

an updating unit operable, after the update information has been recorded onto said second recording medium, and if no interruption of the update procedures has taken place, to update location information on the first recording medium based on the update information, so as to show the storage location of the data constituting the content of the file after updating the file;

a recovery unit operable, if an interruption of the update procedures has taken place, and if a predetermined condition is satisfied, to determine which of the plurality of update procedures has been executed based on the progress information, and on a basis of the determination, to update the location information on the first recording medium so as to show the storage location of the data constituting one of the content of the file after updating the file or the content of the file before updating the file;

an ID recording unit operable, before the updating of the file on the first recording medium by said updating unit, to read unique medium identifier information from one specific position in the first recording medium, and to hold the medium identifier information within said file-update apparatus; and a recovery suppressing unit operable, if the interruption of the update procedures has taken place and the predetermined condition is satisfied, and before said recovery unit updates the location information, to read medium identifier information from a same position as the specific position in a removable recording medium mounted in said file-update apparatus, compare the read medium identifier information with the held medium identifier information, and suppress the updating of the location information by said recovery unit if the read medium identifier information does not match the held medium identifier information, wherein, if said recovery unit determines that less than a predetermined number of the update procedures has been executed, the location information on the first recording medium is returned to a pre-update state by said recovery unit, the pre-update state being a state of the location information before the execution of the update procedures began, and wherein, if said recovery unit determines that more than the predetermined number of update procedures has been executed, the execution of the update procedures is resumed and concluded, such that the location information on the first recording medium is recovered to a post-update state, the post-update state being a state of the location information after the conclusion of the update procedures.

2. The file-update apparatus of claim 1, wherein the location information shows storage locations of data constituting contents of all files on the first recording medium, said file-update apparatus targets a plurality of the files for updating, said progress recording unit records progress information for each targeted file, said new-data recording unit conducts, for each targeted file, the recording, onto the first recording medium, of data constituting a content of the file after updating, said update information recording unit conducts the recording of update information, for each file that has undergone data recording by said new-data recording unit, said updating unit conducts, for each file for which update information has been recorded, the updating of location information based on the update information of the file, and said recovery unit, if an interruption of the update procedures has taken place, and if the predetermined condition is satisfied, conducts the updating of location information for each file, when judged, based on the progress information of the file, that update information relating to the file has been recorded.

3. The file-update apparatus of claim 2, further comprising:

a close instruction receiving unit operable to receive a close instruction relating to individual files that have undergone data recording by said new-data recording unit, wherein the progress information includes information for identifying whether a close instruction has been received, said updating unit conducts, for each file, the updating of location information, only after update information relating to the file has been recorded and a close instruction relating to the file has been received, and said recovery unit, if an interruption of the update procedures has taken place, and if the predetermined condition is satisfied, conducts the updating of location information for each file, only when judged, based on the progress information of the file, that update information relating to the file has been recorded and a close instruction-relating to the file has been received.

4. The file-update apparatus of claim 2, wherein the first recording medium stores (i) FAT information showing, for each of a plurality of clusters on the first recording medium, whether data constituting any file content is stored in the cluster, and that clusters storing data constituting the content of the same file are linked, and (ii) directory information showing, for each file on the first recording medium, the first cluster storing data constituting the content of the file, the location information is formed from the directory information and all FAT information except for unused-cluster information, the unused-cluster being FAT information showing clusters that do not store data constituting any file content, the update information relating to each file that has undergone data recording by said new-data recording unit is formed from (i) consecutive-relation information showing that clusters storing data constituting the content of the file after updating are linked, and (ii) entry information showing the first cluster storing data constituting the content of the file after updating the file, said updating unit, for each file for which update information has been recorded, updates (i) the FAT information based on the consecutive-relation information of the file, so as to show that clusters storing data constituting the content of the file after updating are linked, and (ii) directory information relating to the file based on the entry information of the file, so as to show the first cluster storing data constituting the content of the file after updating the file, and said recovery unit updates the location information by updating the FAT information based on the consecutive-relation information and the directory information based on the entry information.

5. The file-update apparatus of claim 4, further comprising:

an area-release unit operable, for each file for which update information has been recorded, to record, onto said second recording medium, free-space information showing that clusters which stored data constituting the content of the file before updating do not store data constituting any file content, wherein said updating unit conducts the updating of the FAT information so that the free-space information is reflected in the unused-cluster information, and said recovery unit conducts the updating of the FAT information so that the free-space information is reflected in the unused-cluster information.

6. The file-update apparatus of claim 5, further comprising:

a FAT-information copying unit operable, before the updating of any of the files, to copy the FAT information on the first recording medium into a working FAT area on said second recording medium, as working FAT information; and a close instruction receiving unit operable to receive a close instruction relating to individual files that have undergone data recording by said new-data recording unit, wherein the progress information includes information for identifying whether a close instruction has been received, said new-data recording unit records data constituting the content of the file after updating the file into clusters not storing data, based on (i) the working FAT information and (ii) the used-area information or the consecutive-relation information, said update information recording unit makes the working FAT information reflect (i) the consecutive-relation information of each file for which a close instruction has been received, and (ii) free-space information that shows clusters which stored data constituting the content of the file before updating do not store data constituting any file content, said updating unit updates the FAT information based on the working FAT information, and said recovery unit, if an interruption of the update procedures has taken place, and if the predetermined condition is satisfied, (i) makes the working FAT information reflect, for each file, consecutive-relation information and free-space information that relate to the file, when judged, based on the progress information of the file, that a close instruction relating to the file has been received, (ii) updates the FAT information based on the working FAT information, and (iii) updates the directory information based on the entry information of each file whose progress information shows that a close instruction has been received.

7. The file-update apparatus of claim 6, further comprising:

an update instruction receiving unit operable, at a time of recovery, to receive an update instruction indicating that if the first recording medium stores data constituting post-update file content, the location information is to be updated so as to show the storage location of the data, wherein said recovery unit, if an interruption of the update procedures has taken place, and if the predetermined condition is satisfied and the update instruction has been received, makes the working FAT information, prior to use in updating the FAT information, reflect for each file, consecutive-relation information and free-space information that relate to the file, when judged, based on the progress information of the file, that update information relating to the file has been recorded.

8. The file-update apparatus of claim 1, wherein the first recording medium includes an authentication area and a normal area that are mutually independent, a predetermined access restriction applying to only the authentication area of the two areas, the location information is formed from (i) first location information showing storage locations, within the authentication area, of data constituting contents of all files in the authentication area, and (ii) second location information showing storage locations, within the normal area, of data constituting contents of all files in the normal area, the progress information is formed from (i) first progress information showing, for each file in the authentication area, which of the update procedures have been executed in updating the file, and (ii) second progress information showing, for each file in the normal area, which of the update procedures have been executed in updating the file, said new-data recording unit (i) conducts, for each file in the authentication area targeted for updating, the recording, into the authentication area, of data constituting a content of the file after updating, and (ii) conducts, for each file in the normal area targeted for updating, the recording, into the normal area, of data constituting a content of the file after updating, the update information is formed from (i) first update information showing, for each file in the authentication area that has undergone data recording by the new-data recording unit, the storage location, within the authentication area, of data constituting the post-update file content, and (ii) second update information showing, for each file in the normal area that has undergone data recording by the new-data recording unit, the storage location, within the normal area, of data constituting the post-update file content, and said updating unit (i) conducts, for each file in the authentication area for which first update information has been recorded, the updating of first location information based on the first update information of the file, and (ii) conducts, for each file in the normal area for which second update information has been recorded, the updating of second location information based on the second update information of the file.

9. The file-update apparatus of claim 1, wherein the first recording medium is a flash memory, and said second recording medium is a memory that is accessible faster than the first recording medium.

10. The file-update apparatus of claim 9, wherein said second recording medium is a RAM, and has power supplied by a power source that is independent from a power source of the first recording medium.

11. A file-update method for executing a plurality of update procedures to update a file on a first recording medium, said file-update method comprising:

recording, onto a second recording medium, progress information showing which of the update procedures have been executed in updating the file;

recording, onto the first recording medium, data constituting a content of the file after updating the file, in a different storage location from data constituting a content of the file before updating the file;

recording, on the second recording medium, update information showing the storage location, on the first recording medium, of the data constituting the content of the file after updating the file;

updating, after the update information has been recorded onto the second recording medium, and if no interruption of the update procedures has taken place, location information on the first recording medium based on the update information, so as to show the storage location of the data constituting the content of the file after updating the file;

determining, if an interruption of the update procedures has taken place, and if a predetermined condition is satisfied, which of the plurality of update procedures has been executed based on the progress information, and on a basis of said determining, updating the location information on the first recording medium, so as to show the storage location of the data constituting one of the content of the file after updating the file or the content of the file before updating the file;

reading, before the updating of the file on the first recording medium, unique medium identifier information from one specific position in the first recording medium, and holding the medium identifier information within a file-update apparatus; and reading, if the interruption of the update procedures has taken place and the predetermined condition is satisfied, and before the updating of the location information on the first recording medium, medium identifier information from a same position as the specific position in a recording medium of a processing target, comparing the read medium identifier information with the held medium identifier information, and suppressing the updating of the location information if the read medium identifier information does not match the held medium identifier information, wherein, if it is determined in said determining that less than a predetermined number of the update procedures has been executed, the location information on the first recording medium is returned to a pre-update state, the pre-update state being a state of the location information before the execution of the update procedures began, and wherein, if it is determined in said determining that more than the predetermined number of update procedures has been executed, the execution of the update procedures is resumed and concluded, such that the location information on the recording medium is recovered to a post-update state, the post-update state being a state of the location information after the conclusion of the update procedures.

12. A computer program recording medium on which a program is recorded, the program being for causing a computer to execute a file-update method for executing a plurality of update procedures to update a file on a first recording medium, said file-update method comprising:

recording, onto a second recording medium, progress information showing which of the update procedures have been executed in updating the file;

recording, onto the first recording medium, data constituting a content of the file after updating the file, in a different storage location from data constituting a content of the file before updating the file;

recording, on the second recording medium, update information showing the storage location, on the first recording medium, of the data constituting the content of the file after updating the file;

updating, after the update information has been recorded onto the second recording medium, and if no interruption of the update procedures has taken place, location information on the first recording medium based on the update information, so as to show the storage location of the data constituting the content of the file after updating the file;

determining, if an interruption of the update procedures has taken place, and if a predetermined condition is satisfied, which of the plurality of update procedures has been executed based on the progress information, and on a basis of said determining, updating the location information on the first recording medium, so as to show the storage location of the data constituting one of the content of the file after updating the file or the content of the file before updating the file;

reading, before the updating of the file on the first recording medium, unique medium identifier information from one specific position in the first recording medium, and holding the medium identifier information within a file-update apparatus; and reading, if the interruption of the update procedures has taken place and the predetermined condition is satisfied, and before the updating of the location information on the first recording medium, medium identifier information from a same position as the specific position in a recording medium of a processing target, comparing the read medium identifier information with the held medium identifier information, and suppressing the updating of the location information if the read medium identifier information does not match the held medium identifier information, wherein, if it is determined in said determining that less than a predetermined number of the update procedures has been executed, the location information on the first recording medium is returned to a pre-update state, the pre-update state being a state of the location information before the execution of the update procedures began, and wherein, if it is determined in said determining that more than the predetermined number of update procedures has been executed, the execution of the update procedures is resumed and concluded, such that the location information on the recording medium is recovered to a post-update state, the post-update state being a state of the location information after the conclusion of the update procedures.

* * * * *